United States Patent [19]
Fukada et al.

[11] Patent Number: 5,761,480
[45] Date of Patent: Jun. 2, 1998

[54] DISPLAY CONTROL METHOD

[75] Inventors: Taisei Fukada; Hideto Kohtani, both of Yokohama, Japan

[73] Assignee: Canon Kabushiki Kaisha, Tokyo, Japan

[21] Appl. No.: 425,792

[22] Filed: Apr. 20, 1995

[30] Foreign Application Priority Data

| Apr. 20, 1994 | [JP] | Japan | .................. 6-081995 |
| Apr. 20, 1994 | [JP] | Japan | .................. 6-082005 |

[51] Int. Cl.⁶ .................................................. G06F 11/32
[52] U.S. Cl. ............... 395/500; 395/183.13; 395/183.22; 358/401; 358/442
[58] Field of Search .................. 395/835, 828, 395/839, 183.01, 183.06, 183.09, 185.01; 364/550

[56] References Cited

U.S. PATENT DOCUMENTS

| 4,711,560 | 12/1987 | Hosaka et al. .................. 355/14 C |
| 4,742,483 | 5/1988 | Morrell ............................ 364/900 |
| 5,023,817 | 6/1991 | Au et al. ......................... 364/550 |
| 5,073,818 | 12/1991 | Iida ..................................... 358/80 |
| 5,077,768 | 12/1991 | Shigyo et al. .................... 378/98 |
| 5,493,408 | 2/1996 | Kurogane et al. .............. 358/296 |
| 5,539,877 | 7/1996 | Winokur et al. ........... 395/183.02 |
| 5,581,715 | 12/1996 | Verinsky et al. ............... 395/309 |

OTHER PUBLICATIONS

Karney et al. "Fast and Flexible", PC Magazine, vol. 13, No. 20, pp. 197-223, Nov. 22, 1994.

Primary Examiner—Kevin J. Teska
Assistant Examiner—Russell W. Frejd
Attorney, Agent, or Firm—Morgan & Finnegan, LLP

[57] ABSTRACT

A plurality of image processing apparatuses connected to a network share an external storage device such as a CDROM with each other to indicate a guidance when a trouble happens. Each image processing apparatus, when the troubles happens, outputs a request for transferring display data corresponding to a type of the trouble to the external storage device. This facilitates changing the guidance displayed. If the image processing apparatuses are used as peripheral units to a plurality of computers, and when a construction of the peripheral unit is varied, a driver program corresponding thereto is transferred to the plurality of computers.

18 Claims, 17 Drawing Sheets

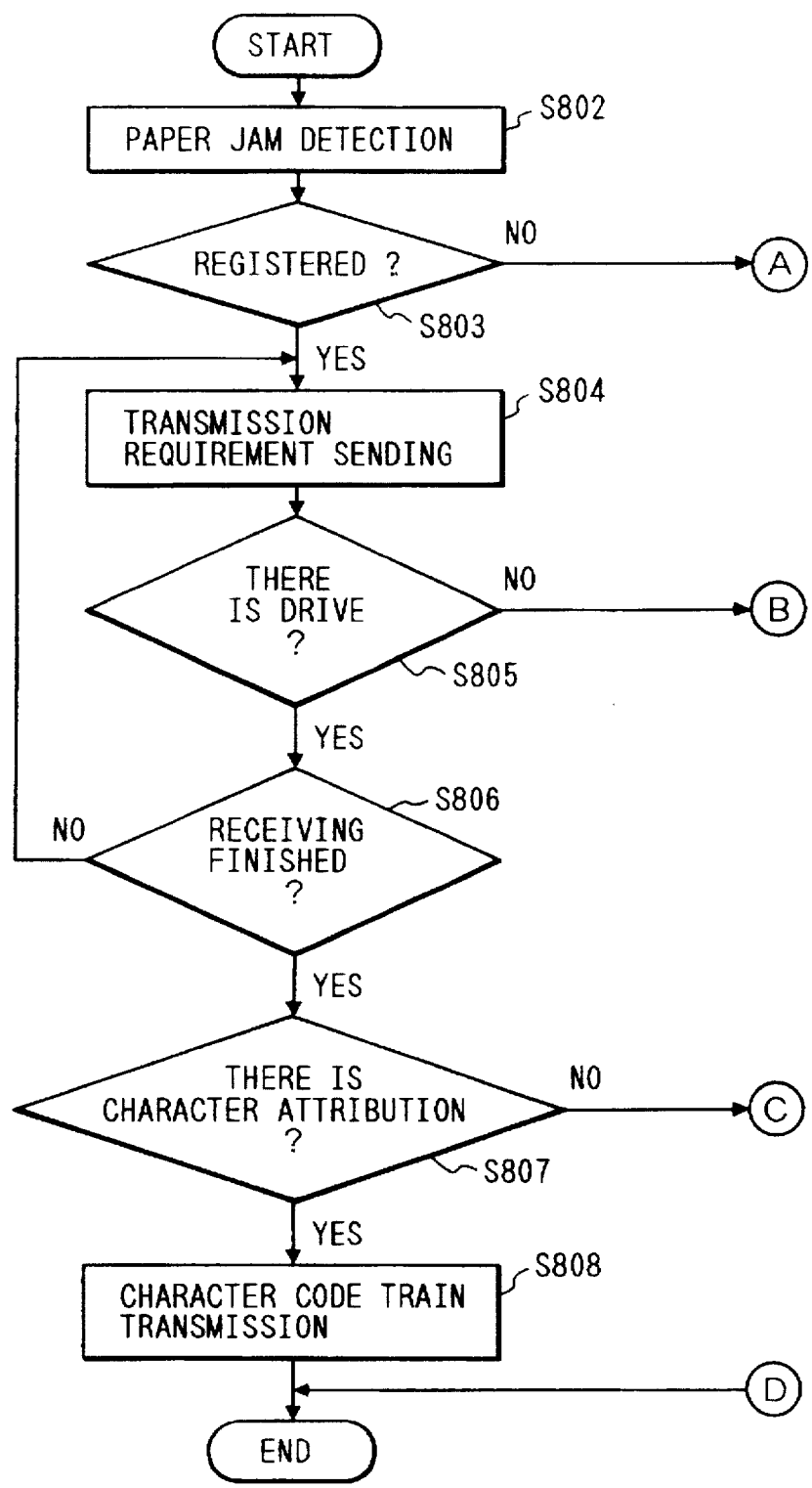

FIG. 17

| FILE NAME | DATA ATTRIBUTION | DATA DEVELOPMENT POSITION | IMAGE FRAME SIZE X, IMAGE FRAME SIZE Y | TOTAL AMOUNT OF IMAGE DATA (FRAME) | IMAGE/CHARACTER DATA |
|---|---|---|---|---|---|

DISPLAY CONTROL METHOD

BACKGROUND OF THE INVENTION

1. Field of the Invention

The present invention relates to a method of updating (renewing) a program or data in a system to which a plurality of image processing apparatuses are connected.

2. Related Background Art

According to a conventional control method of peripheral units to a computer by use of a program, if the peripheral unit or a construction thereof is changed, the user newly installs a driver program corresponding thereto. For example, when the driver program is built in a host computer, a corresponding driver program is newly installed in the host computer.

There is, however, shown a one-to-one correspondence between the peripheral unit and the host computer, and this is not so time-consuming. If such a state appears in a network environment wherein a single system is constructed of a plurality of peripheral units and a plurality of host computers, however, it is required that the driver programs be reinstalled in all the host computers. This is very time-consuming. Furthermore, in the above network environment, a control device of each host computer is not necessarily constructed of a common instruction set, and the reinstallation becomes more complicated and more time-consuming with an increase in the number of types thereof. Changing the driver program and a new installation thereof are troublesome irrespective of knowing where the above-mentioned control device for executing the driver program belongs to.

In the conventional image forming apparatus, when inducing the user to an attention, or explaining the way of use, or displaying a status of the apparatus, image data and character data (hereinafter referred to as message data) in the storage device are synthesized on a RAM within the apparatus. A bitmap image obtained as a result of this is transferred to a display device, thus displaying a proper message.

In this case, the image data within the storage device are compressed based on a proper compression algorithm, e.g., a Lampel-Ziv algorithm. Further, document data are transformed into a character code string, and the code string and the bitmapped character pattern data are separately stored.

According to the conventional image forming apparatus, in this way, all the message data are stored in a compressed form in the storage device (hereinafter called a message ROM) of the apparatus. Reductions both in capacity of the ROM employed and in cost of the apparatus are thus actualized.

Further, in the above-mentioned case, a content of the message is changed by replacing this message ROM. For example, there is taken such a method that the message ROM to be mounted is changed depending on an export destination of the apparatus, and a product corresponding to a language used by the user is thus supplied.

In other words, when the image- and character-data are displayed on the display unit of the conventional image forming apparatus, the apparatus employs the data stored in the storage device, such as a ROM, mounted in the apparatus. Hence, a storage device having a larger capacity is needed as the quantity of the data displayed on the display unit increases.

Further, it is required that the storage device mounted in the apparatus be replaced when changing the image and the character that are to be displayed, and a delivery of the parts entails a good deal of effort. Particularly, if a multiplicity of the image forming apparatuses including the same display devices are connected to the network, the amount of effort increases in proportion to a scale of the network.

According to the image forming apparatus in recent years, however, the number of messages displayed tends to increase with multi-functionalization thereof. Also, the cost of the display device becomes smaller, and, correspondingly, the display device having a larger area is on the spread use as a display unit of the image forming apparatus. This entails displaying the messages containing a greater quantity of data than before.

Demanded, e.g., are such functions that even the user unaccustomed to the apparatus is able to easily perform the processing by displaying procedures of obviating a paper jam together with a sketch diagram of the apparatus and that an improvement of productivity of an office work is promoted by presenting an efficient usage of the apparatus to the user with an indication of an explanatory note of the way of using the apparatus.

Then, if there are increases in both the total number of messages displayed and in the quantity of the data individual message, the capacity of the ROM needed for storing them also increases. Coping with this situation entails adopting a large capacity ROM available at a higher price or a method of increasing the number of ROMs mounted in the products. Accordingly, this brings about a rise in the costs of the parts, a complicated process of manufacturing the product and, in turn, an increase in the product price.

Further, the apparatus incorporates the ROMs for storing different items of message data according to the export destinations in order to correspond to the user-oriented languages. In this case, the following problems arise.

That is, there is rather a small number of areas and countries where a single language is spoken the world over. Demands of the users can not be elaborately responded any more merely by changing the product specifications provided according to the delivery destinations.

Further, there can be also considered a method of incorporating the message ROM corresponding to a distribution channel of the products at a stage of delivering the products. This method, however, involves the intricate manufacturing process, with the result that a new investment in plant and equipment and also a new personnel expenditure are needed. In addition, there is presently taken a method of replacing the message ROM on the market only when requested by the user after delivering the product. However, much time is spent till a request for the replacement by the user is sent to the manufacturer via a sales shop and an import/export agency, the parts are further delivered from the manufacturer, and the ROM is replaced on the side of the user.

Then, such a service is not a periodic practice, and, besides, the products are received and transferred on a route different from the one on the normal occasion of supplying the mass-produced products. Consequently, the communications between related divisions and procedures needed for customs clearance and delivery become complicated.

Such circumstances, may be factors of hindering rationalization of the office procedures on the product supply side. As a result, the supplier has to demand the user for a higher payment for services, but this is not favorable situation to the two parties.

Further, in the great majority of cases, all the people do not necessarily freely read and write in a plurality of languages in the area where the plurality of languages are spoken. Nowadays, an area-to-area migration of the population is activated, and this tendency can be seen in respective areas. In such a situation of the society, the present form of supplying the products has to be changed enough to supply the products exhibiting a high usability to the people who speak a variety of languages.

As described above, in the present situation where the message ROMs are manufactured according to the products, the problems given above are caused per product.

SUMMARY OF THE INVENTION

It is a primary object of the present invention to provide a system control method and a system control apparatus that are capable of obviating the defects described above.

It is another object of the present invention to provide a system control method and a system control apparatus that are capable of changing a peripheral unit or a configuration of the peripheral unit, further automatically setting a modification and an addition to a control method of the peripheral unit in accordance with a driver program or the like with an addition of a new peripheral unit and thus relieving the labor for a reinstallation by the user.

It is still another object of the present invention to provide a system control method and a system control apparatus that are capable of automatically setting a modification and an addition of a control method of a peripheral unit in accordance with a driver program irrespective of a type of an instruction set for controlling the peripheral unit and thus relieving the labor for a reinstallation by the user.

It is a further object of the present invention to provide a system control method and a system control apparatus that are capable of easily updating display contents of a plurality of image forming apparatuses connected to a network or the like.

It is a still further object of the present invention to provide a system control method of and a system control apparatus for controlling a storage and a read of message data so that the message data to be displayed on a display unit can be efficiently read in accordance with a content thereof.

Other objects of the present invention will become apparent from the following discussion taken in conjunction with the accompanying drawings.

BRIEF DESCRIPTION OF THE DRAWINGS

FIG. 17 is a diagram showing a structure of data transferred to the copying machine from a CDROM drive 8000.

DETAILED DESCRIPTION OF THE PREFERRED EMBODIMENTS

<Construction of Image Processing System in Present Embodiment>

Figure 1:
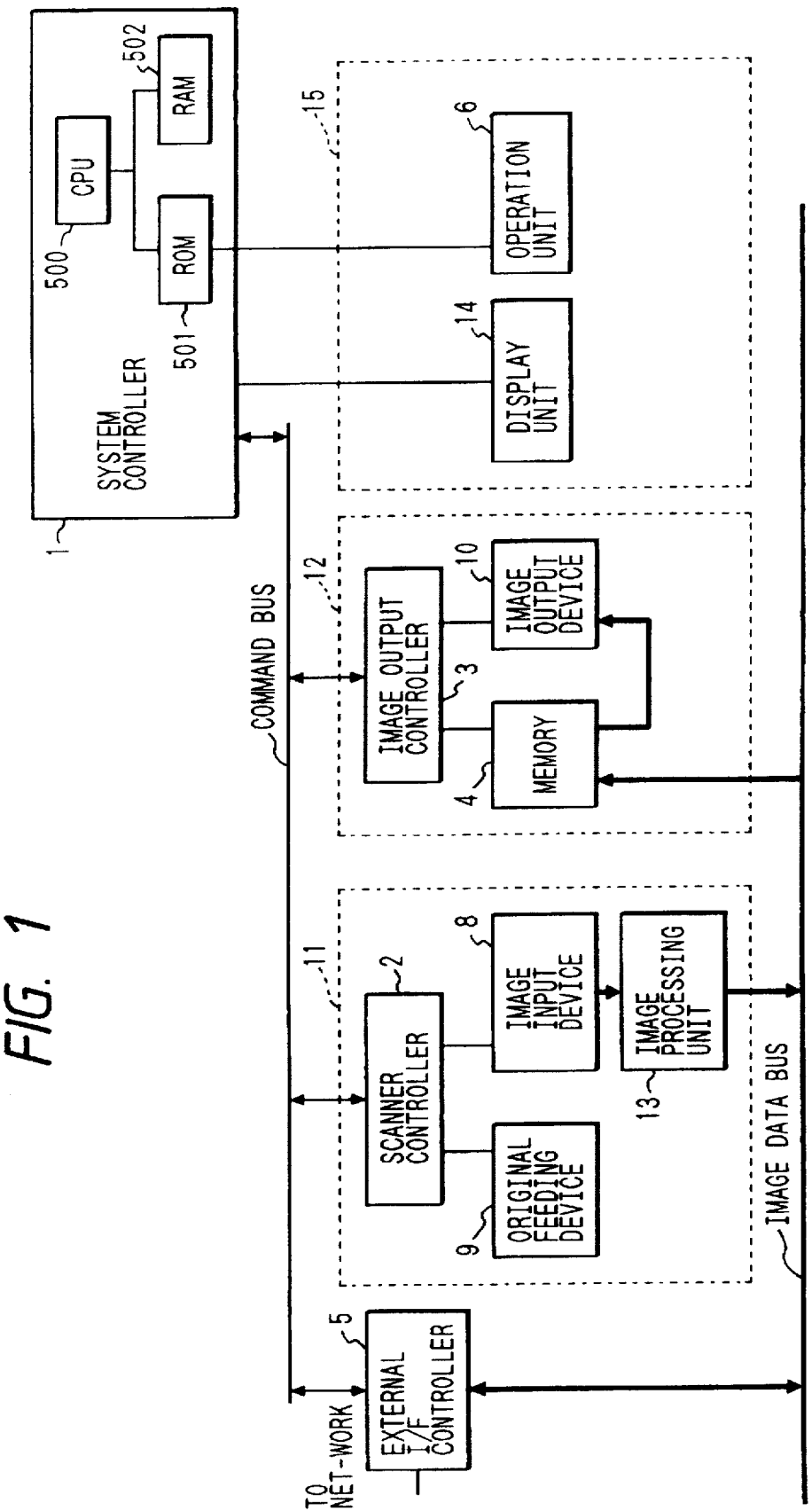
FIG. 1 is a block diagram illustrating a construction of an image processing system.

FIG. 1 is a block diagram illustrating a construction of an image processing system in one embodiment of the present invention. Note that the image processing system is controlled based on a driver program stored in a host computer in this embodiment, but an application of this invention is not confined to this construction.

Referring again to FIG. 1, a system controller 1 controls the operation of the image processing system as a whole. The system controller 1 controls the system on the basis of data inputted by the operator from an operation unit 6 and thus manages the entire system. This system controller 1 stores respective host programs for controlling all the constructive elements connectable to the image processing system or a control program constructed corresponding to the present construction. A scanner controller 2 controls an image input device 8 for reading an original and outputting an item of image data, an original feeding device 9 for feeding a plurality of originals to a reading position of the image input device 8 and an image processing unit 13 for editing the image data given from the image input device 8. An image output controller 3 controls a large capacity memory 4 and an image output device 10, including plural types of recording paper cassettes, for outputting the image data in the form of a visible image onto a sheet of recording paper in accordance with a print instruction. An external interface controller 5 controls transferring and receiving of the data with respect to an external interface such as a LAN, etc.

Herein, the numeral 11 designates a scanner module including elements for reading the image and performing the processing in the image processing unit 13, the numeral 12 represents an image output module, and the numeral 15 denotes a panel module. This image processing system is connected via the above external interface controller 5 to a host computer in a network. The scanner module 11 and the image output module 12 are peripheral units of the host computer.

Figure 2:
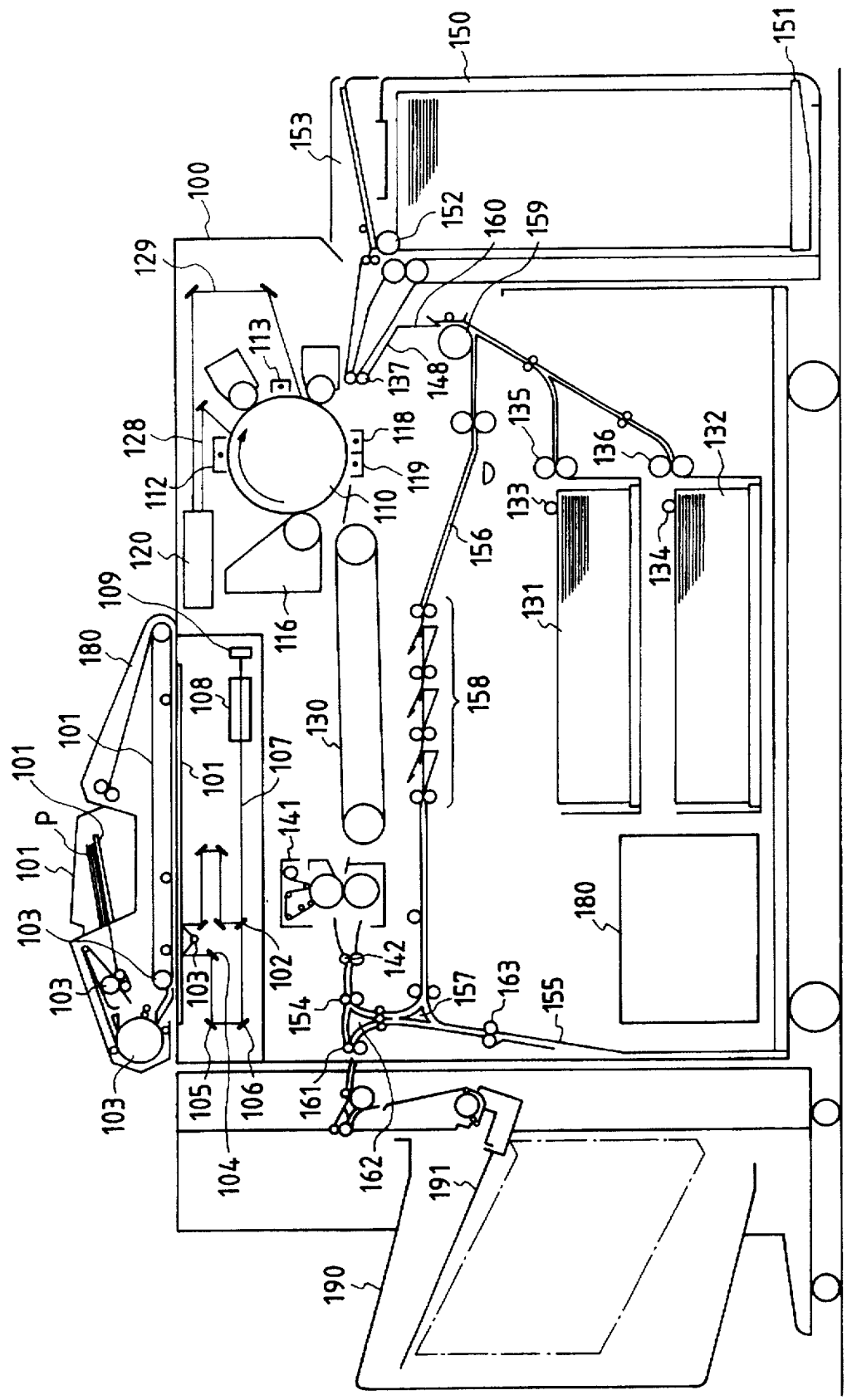
FIG. 2 is a sectional view of an image forming apparatus.

FIG. 2 is a sectional view illustrating the image forming apparatus including the scanner module 11, the image output module 12 and the panel module 15 in the image processing system of FIG. 1. Given is an explanation of the operation when driving the present apparatus in the form of a printer.

Note that there will be omitted the explanation in the case of using the image forming apparatus of FIG. 2 as a scanner or a copier.

The external interface controller 5 described above receives the printer output data from the host computer connected to the network. The external interface controller 5 includes an unillustrated printer output image generator. When an image is generated by this printer output image generator, communications are conducted between the system controller 1 and the image output controller 3 via a command bus in FIG. 1, and the image data is transferred via an image data bus to the memory 4.

Hereat, the image data transferred to the memory 4 is further transferred to a laser drive circuit 120 of FIG. 2. At this time, the image data is converted into a laser modulation signal by the image output device 10. Based on this signal, the laser irradiates a photosensitive body 110 with a laser beam. A latent image formed on the photosensitive body is transferred on the sheet fed from a sheet supply units 131, 132 in an ordinary electrophotographic process. The sheet passing through a feeding unit 130 is fixed with an image by a fixing device 141 and discharged through feed rollers 142, 154, 161.

Further, some option units are attachable to and detachable from this image forming apparatus. Herein, the option units are, referring to FIG. 2, a bulk sheet supply device 150, a double-side print paper feeding unit composed of feeding paths 156, 158 and a sorter 190. The bulk paper supply device 150 operates in the same way as the sheet supply units 131, 132. The recording sheet is fed to the double-side print feeding unit, and, for this purpose, at first, after the edge of the sheet passes through the feed rollers 152, the sheet is fed downward by a first feeding path switching member 162. Thereafter, the recording sheet is reversed by a second feeding path switching member 157 on a reversion feeding path. After this reversion, the sheet is again fed to the feeding path 158 by the second feeding switching member 157. When the printing is effected on the rear surface, in the same way as feeding the sheet from the ordinary paper feeding unit, the sheet is fed out of the feeding path 156. Also, in the case of employing the sorter 190, the sheets of paper are, after passing through the feed rollers 161, sorted into sort bins.

<Setting of Control Method of Image Processing System in This Embodiment>

Figure 3:
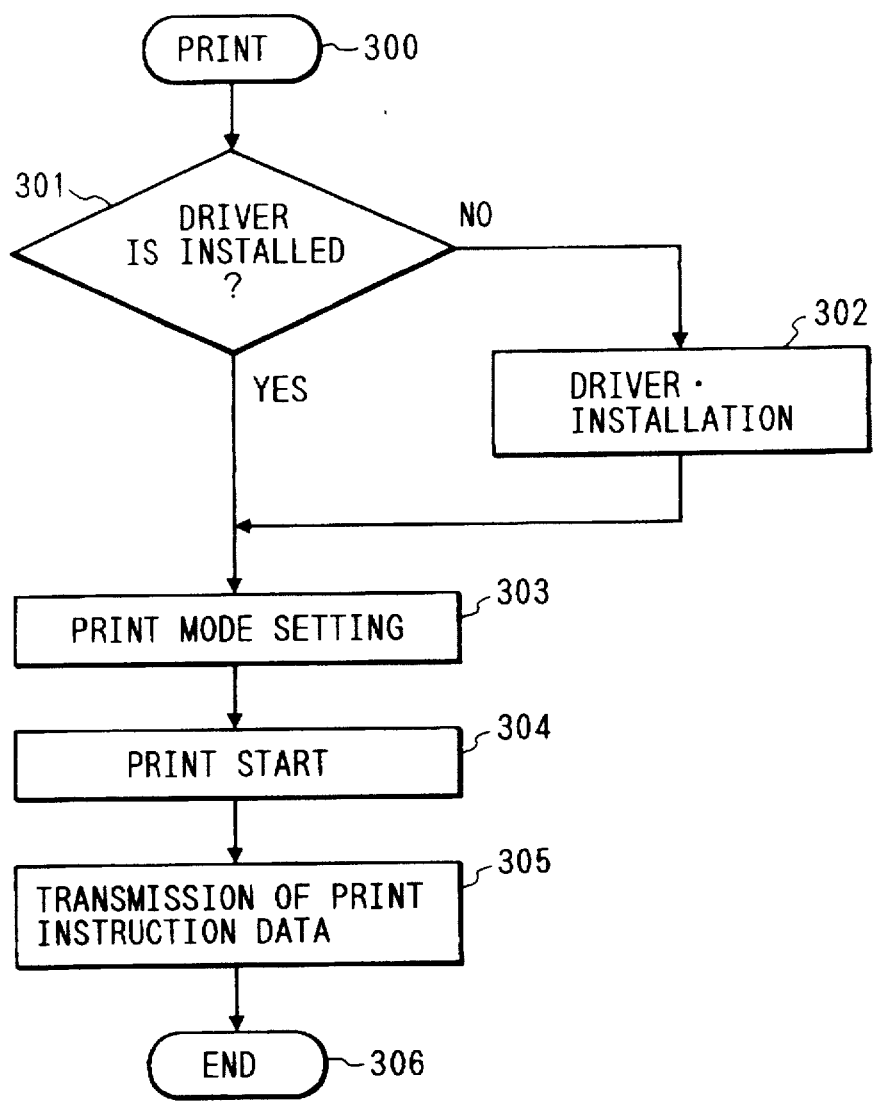
FIG. 3 is a flowchart showing the processing of driving a printer by a conventional host computer.

FIG. 3 is a flowchart showing procedures of driving the printer from the host computer in the conventional manner.

The user gives an indication of starting the print on the host computer (step 300). The user determines whether or not target printer driver software is incorporated into the computer (step 301). If not, the user has to install the target driver program into the computer (step 302). When incorporated thereinto, a print mode is designated, and an item of print data is transmitted to the printer. The operation of installing the driver program has hitherto depended on the user. If a type and a construction of the printer are changed, the user has to re-install the driver program, which is very time-consuming.

(First Embodiment)

Then, this embodiment will be next discussed with reference to FIG. 4.

A power supply of the image forming apparatus is switched ON (step 400). The image forming apparatus causes a non-volatile memory device to store a system architecture when the power supply was switched ON before. This system architecture is compared with a current system architecture (step 401). Inputted to the image forming apparatus is a signal for determining whether or not the above-described attachable/detachable option units in the image forming apparatus are connected. A determination of the system architecture is made by using this signal. If the current system architecture is different from the previously-stored architecture, the driver software based on a new architecture is constructed (step 402). The newly constructed driver software is transferred to the host computer in accordance with a network address registered beforehand in a RAM 502 of the system controller 1 (step 403). Thereafter, the processing proceeds to a normal routine (step 404).

Figure 5:
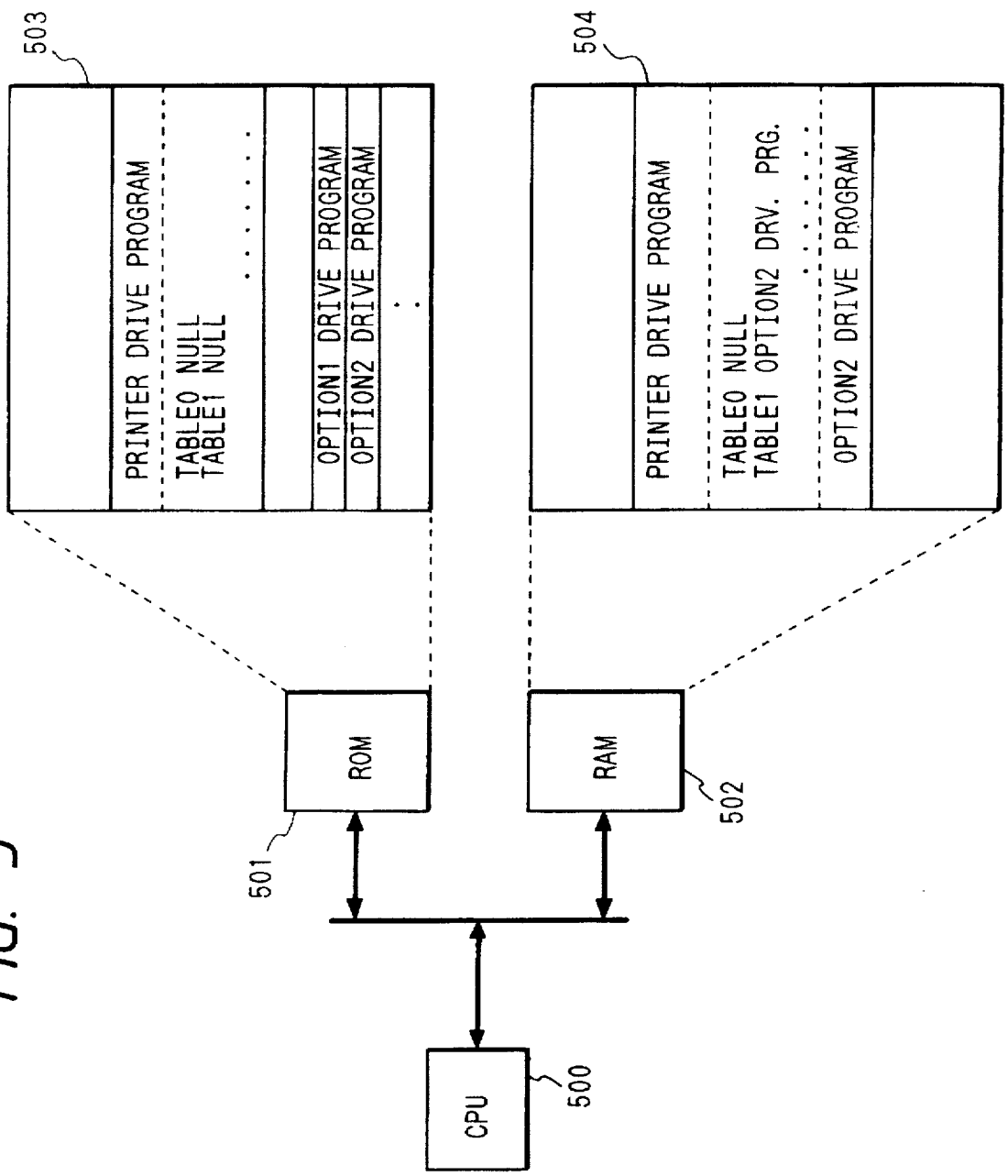
FIG. 5 is a diagram of assistance in explaining the reconstruction of the driver program in the embodiment 1.

The elements constituting the driver software described above will be explained with reference to FIG. 5. Herein, the system controller 1 of FIG. 1 includes a CPU 500, a ROM 501 and a RAM 502.

The CPU 500 controls the system controller 1 of FIG. 1. The control program is stored in the ROM 501, and the driver program for controlling the printer is contained in a portion thereof. This program contains tables (corresponding to TABLE 0, TABLE 1 in a memory map 503) for controlling the option units explained above, and, in the RAM 501, the option units are set in an unconnected status (TABLE 0, TABLE 1 are in a NULL status). Further, a drive program (corresponding to OPTION 1, OPTION 2, DRIVE PROGRAM) for a predicted option unit is also stored beforehand in the ROM 501.

The CPU 500, when there arises a necessity for constructing a new driver program (step 402), develops, on the RAM 502, the driver program stored in the ROM 501. At this time, if OPTION 2 is connected by way of an option unit, the drive program for OPTION 2 in the ROM 501 is simultaneously developed on the RAM 502, and the TABLE 1 in the driver program is changed to the one for OPTION 2 DRIVE PROGRAM. The driver program transferred to the host computer is thereby capable of driving the OPTION 2.

(Second Embodiment)

Also, herein, according to program codes stored in the ROM 501, there are prepared some instruction sets for corresponding to different types of host computers. The above-explained new driver program is created for every instruction set. Before transferring the driver program through the network, the CPU 500 makes an inquiry about a CPU type of the host computer.

Figure 4:
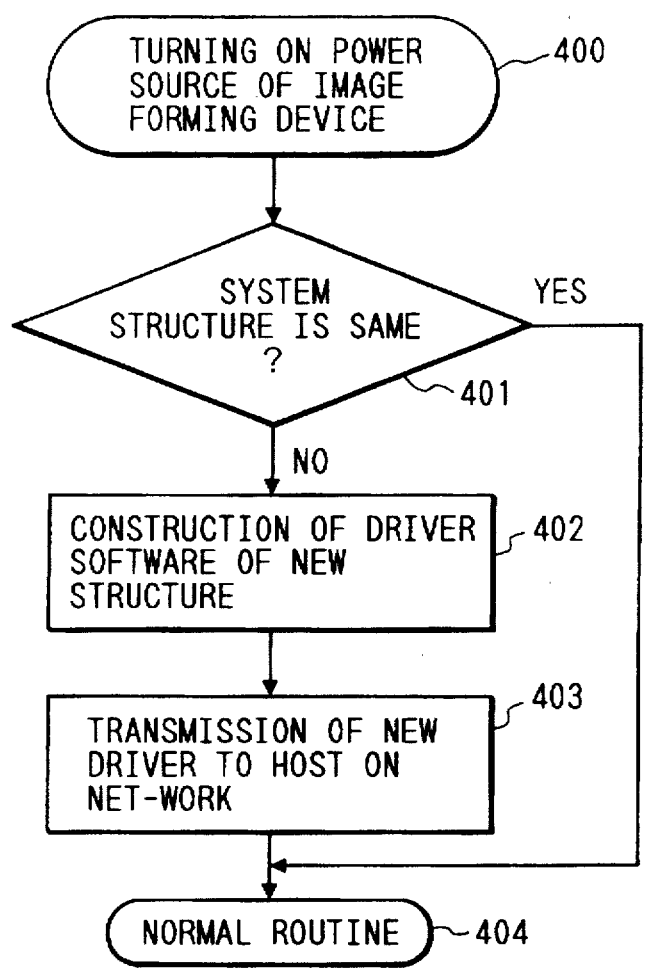
FIG. 4 is a flowchart showing the processing of reconstructing a driver program in an embodiment 1.
Figure 6:
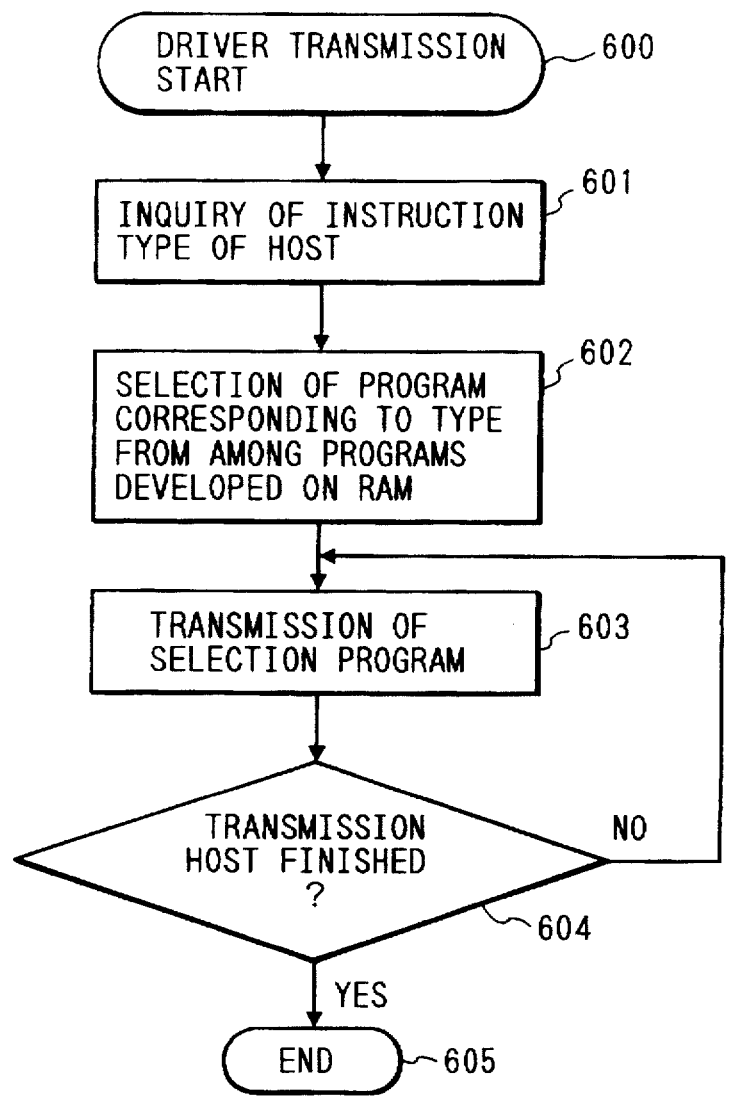
FIG. 6 is a flowchart showing the processing of selecting the driver program in an embodiment 2.

FIG. 6 shows processes including a process corresponding to step 403 of FIG. 4 in this case.

Inquired at first is a type of the instruction of the host computer connected to the network (step 601). Corresponding to a response from the host computer, a program corresponding to the instruction type is selected from a plurality of driver programs developed on the RAM 502 (step 602). The selected program is transferred via the network to the host computer (steps 603, 604).

As explained above, when the construction of the image forming apparatus is changed, there can be automatically transferred such a driver program that a new construction reflects in the host computer connected to the network. At this time, if the ROM 501 for storing the driver program is constructed as a rewritable memory unit, it is obvious that an element for supplying the driver program exhibiting a higher degree of freedom can be offered.

(Third Embodiment)

The following is a description of a third embodiment. There will be stated an example of changing a timing of transferring a new driver program to the host computer in the network in the first embodiment.

In the processes of FIG. 4, step 403 is deleted, and there is provided a method of transferring the driver program after confirming an architecture of the driver program when each host computer gives a request for printing.

Figure 7:
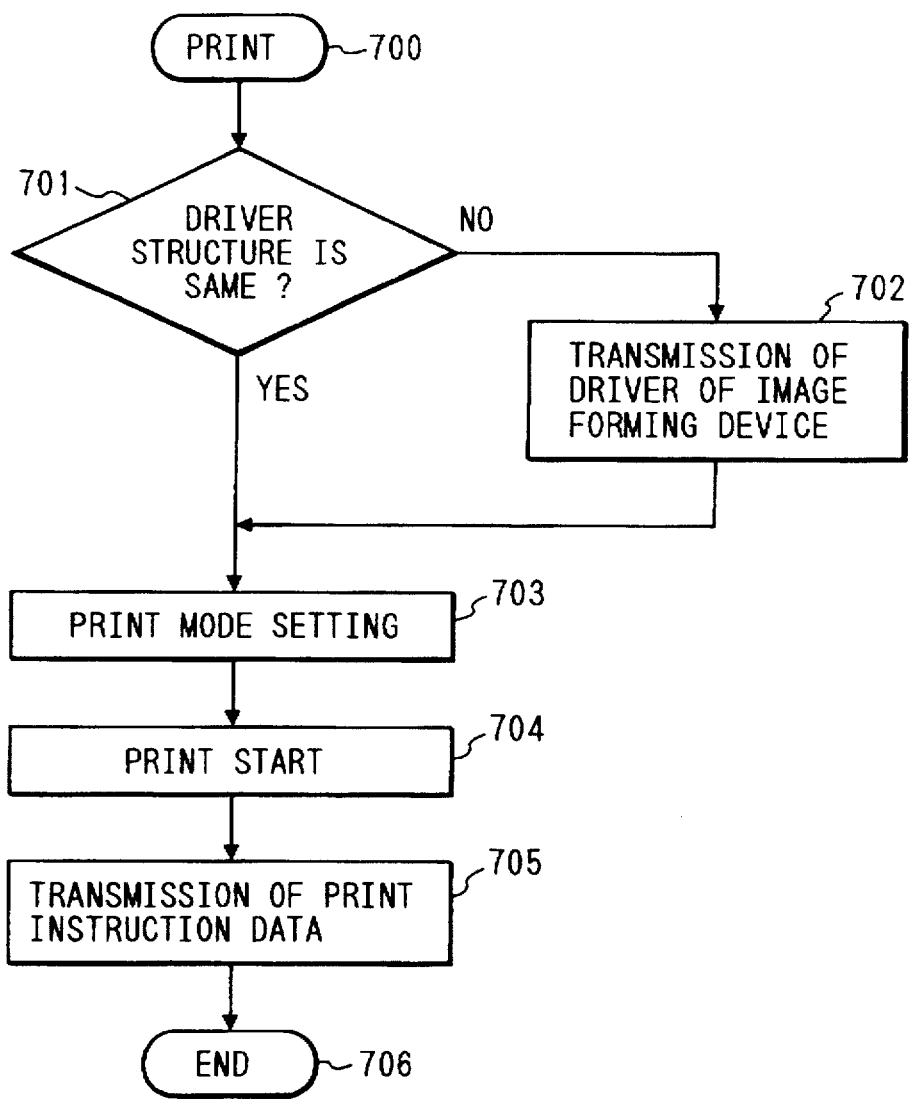
FIG. 7 is a flowchart showing the processing of transferring the driver program in an embodiment 3.

FIG. 7 is a flowchart showing processing procedures of the host computer when making the request for printing in the third embodiment.

To start with, when the print request is given, the host computer compares a printer driver program constructed in the image forming apparatus with a printer driver program within the host computer (step 701). If different from each other, the printer driver program in the image forming apparatus is transferred via the network to the host computer, and the printer driver program in the host computer is updated (step 702). Hereinafter, steps 703–706 are the same as those in FIG. 3.

Where this method is taken, there are yielded such advantages that the host computer to which the driver program is to be transferred is not required to be registered in the image forming apparatus, and also futile items of data do not have to flow through the network because of being transferred according to the necessity. Confirming the driver program architecture involves, it can be considered, the use of a method of comparing a date of constructing the driver program installed in the host computer with a date of constructing the driver program in the image forming apparatus, a method of making a check sum comparison and a method of making a version comparison.

(Fourth Embodiment)

Figure 8:
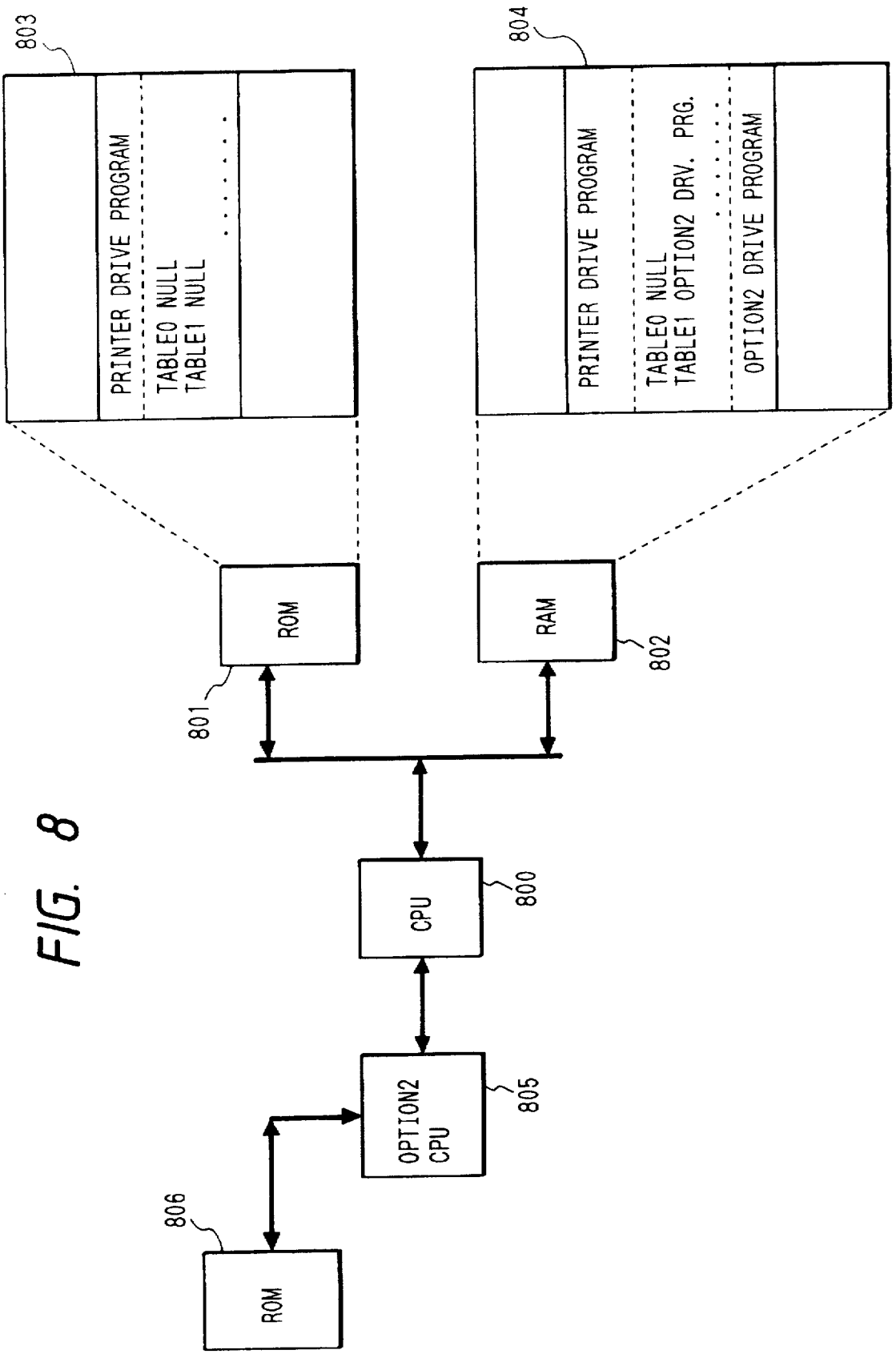
FIG. 8 is a diagram of assistance in explaining the reconstruction of the driver program in an embodiment 4.

In accordance with a fourth embodiment, FIG. 8 shows an example where the option unit itself stores a driver program for the option unit in elements constituting new driver software. A control CPU 805 for the option unit is connected via an unillustrated communication element to a CPU 800 of the image forming apparatus. A ROM 806 for storing a control program of the option unit stores a program for driving the option unit explained before. In the process of constructing the above-described new driver program, when the driver program for the option unit is needed, the driver program is transferred from the ROM 806 via the communication element to a RAM 802. Other operations are the same as those by the above-explained method of constructing the driver program.

In this embodiment, the option unit itself stores the option unit driver program, and, hence, there is a large advantage wherein the present method is effective in option units developed after the image forming apparatus body.

Note that the present invention may be applied to a system constructed of a plurality of units or an apparatus constructed of a single unit. Further, the present invention is, as a matter of course, a case of being attained by supplying a program to the system or the apparatus.

(Fifth Embodiment)

Figure 9:
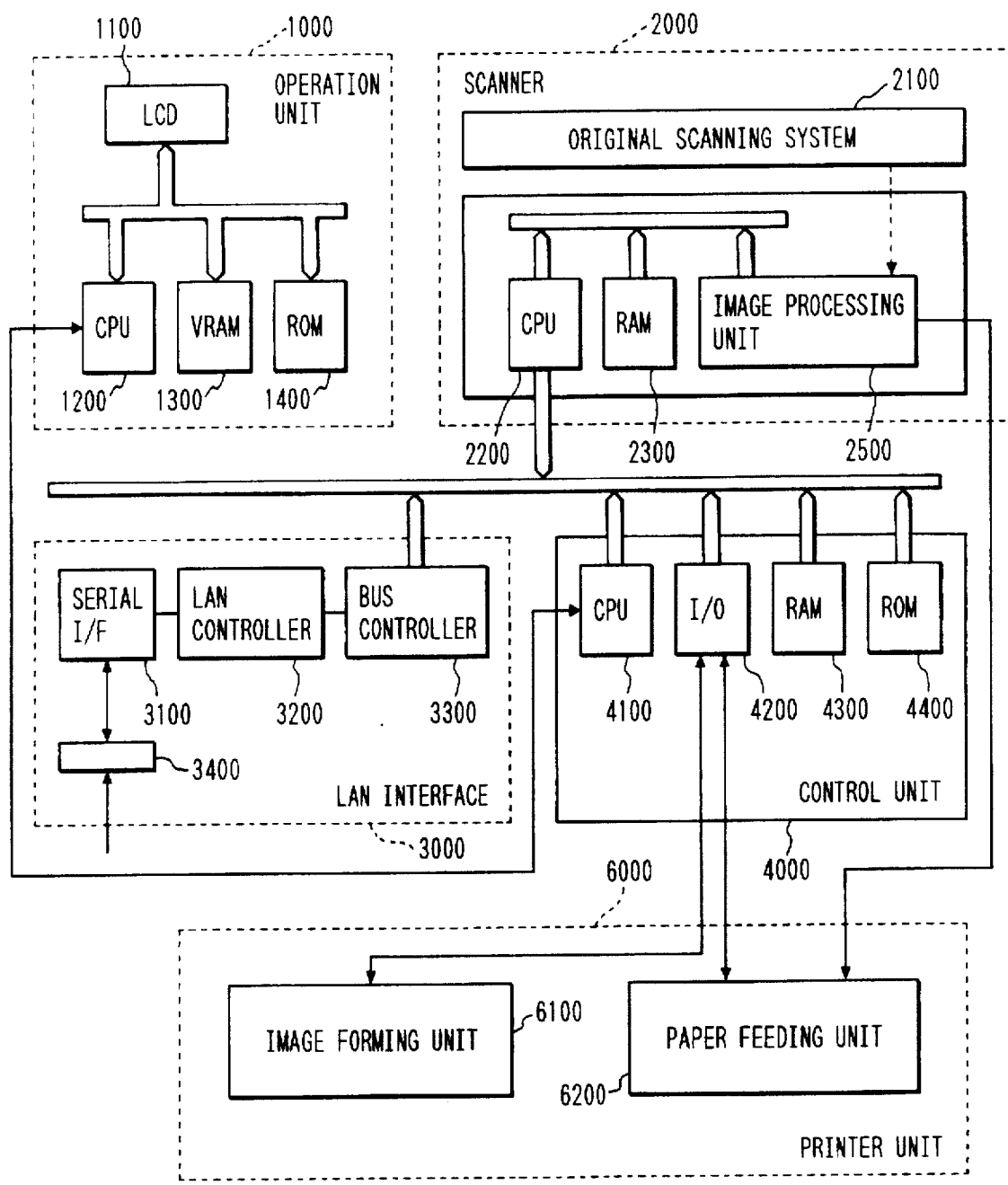
FIG. 9 is a block diagram illustrating a digital copying machine in an embodiment 5 of the present invention.

FIG. 9 is a block diagram illustrating a construction of a digital copying machine incorporating a local area network communication function in accordance with a fifth embodiment of the present invention. As depicted in FIG. 9, the digital copying machine in this embodiment is constructed of an operation unit 1000, a scanner 2000, a LAN interface, a control unit 4000 and a printer unit 6000.

The control unit 4000 has a CPU 4100, an I/O unit 4200, a RAM 4300 and a ROM 4400. The control unit 4000 controls operations of constructive elements in each system on the basis of a control program stored in the ROM 4300. The RAM 4300 is backed up by an unillustrated battery and is so constructed that storage contents thereof are not lost even when the power supply to this digital copying machine is cut off.

The operation unit 1000 controls a user interface unit of the present digital copying machine. The operation unit recognizes indications of messages on an LCD display unit 1100 and key manipulations by the user. A CPU 1200 of this operation unit 1000 performs data communications via a serial transmission line (unillustrated) with the CPU 4100 of the control unit 4000, thereby making it possible to perform both copying operations corresponding to the key manipulations by the user and the message indications corresponding to the copying operations.

For example, if a paper jam is caused in a paper feeding unit 6200 of a printer unit 6000, i.e., if the recording sheet remains in the paper feeding unit at a scheduled copy ending time, the CPU 4100 detects a [stock-of-paper] state in accordance with a signal transmitted from a sensor within the printer unit 6000 through the I/O unit 4200 and informs the CPU 1200 of a paper jam message number.

The CPU 1200 reads a character code string corresponding to the paper jam message number which is stored in the ROM 1400. The CPU 1200 then searches a bitmapped character pattern that corresponds to each character code out of the ROM 1400. Subsequently, this character pattern is developed on the RAM 1300. The CPU 1200 further transfers contents of the RAM 1300 to the LCD display unit 1100, thus completing a display of a desired character string.

Figure 10:
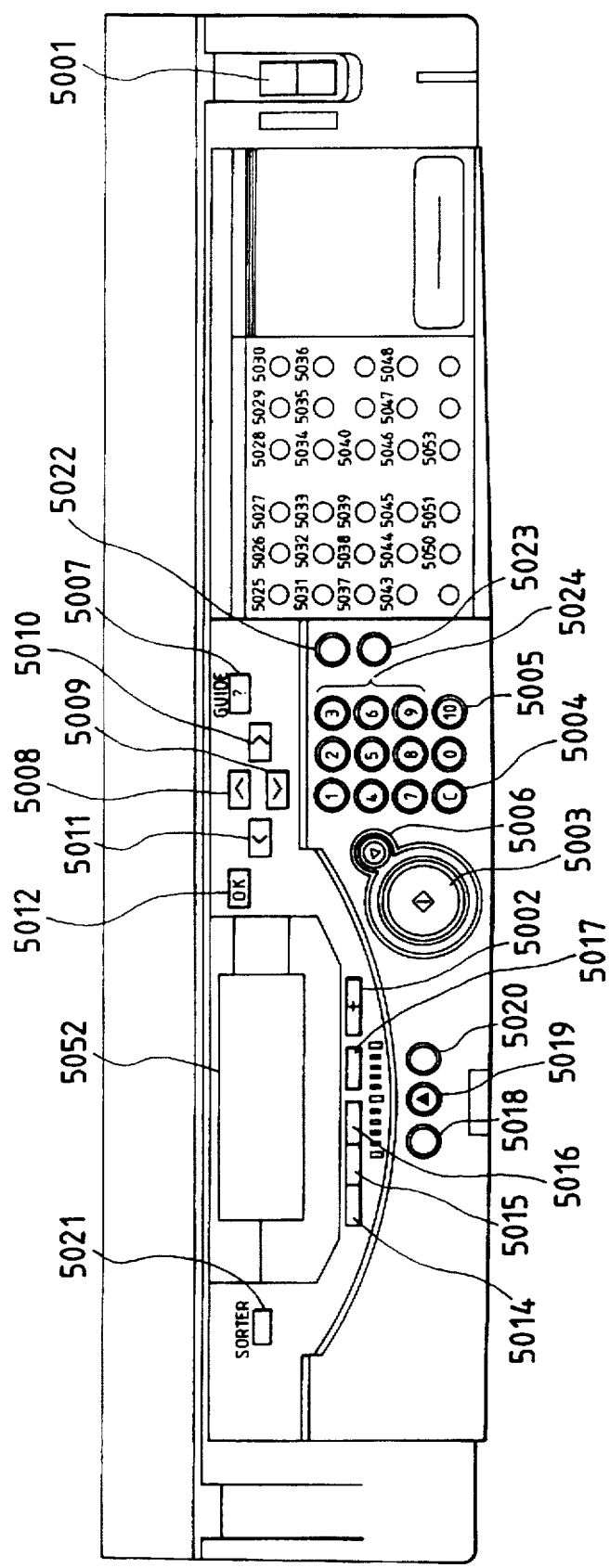
FIG. 10 is a view illustrating an external appearance of an operation panel of the copying machine in the embodiment 5.

FIG. 10 is a view illustrating an external appearance of the operation unit 1000 partly constituting the present digital copying machine. Referring to FIG. 10, a power switch 5001 controls a supply of electricity to each unit within the copying machine. A key 5002 operates to return the copying machine to a standard mode during a standby status of the copying machine. The numeral 5003 designates a copy start key. A clear key 5004 is used for clearing an inputted numerical value.

An ID key 5005 makes an execution and setting of the copying operation impossible as far as a specified code number is not inputted after operating this ID key and thereby permits the use of the copying machine for a specified operator. Further, a stop key 5006 is employed for interrupting or stopping the copy.

A guide key 5007 is used for knowing each function of the copying machine. An upper cursor key 5008 works to move a pointer upward on each function setting picture. A lower cursor key 5009 similarly works to move the pointer downward. Also, a right cursor key 5010 works to move the pointer rightward on each function setting picture. Then, a left cursor key 5011 works to move the pointer leftward.

An OK key 5012 is manipulated in the case of approving the setting on each function setting picture. A fixed form reduction key 5014 is used for reducing a fixed size original image down to other fixed size. Further, an equi-powered key 5015 is employed for selecting an equi-powered copy. A fixed form enlarging key 5016 is employed for enlarging the fixed size original image up to other fixed size.

A cassette selection key 5017 is used for selecting which cassette stage to supply the transfer sheet. A copy density adjusting key 5018 is operated to decrease a density. Similarly, a copy density adjusting key 5020 is employed for increasing the density. Further, an AE key 5019 is employed for automatically optimally adjusting the copy density on the basis of a density of the original.

A key 5021 serves to designate an operation of the sorter. A preheating key 5022 is used for an ON/OFF operation of a preheating mode. The numeral 5023 represents an interrupt key. Further, a ten key 5024 is employed for inputting numerical values of the number of copies, etc. A marker processing key 5025 is operated for setting trimming, masking and partial processing (outline processing, screen processing, shadowing processing and negative/positive processing).

A patterning processing key 5026 is used for expressing colors of the image of the original by patterning or expressing the colors of the image of the original with differences in density. A decolorizing key 5027 is employed for deleting a specified color on the image of the original. An image quality key 5028 is used for setting an image quality to be outputted. Further, a negative/positive key 5029 works to perform negative/positive processing.

Moreover, an image create key 5030 works to effect the outline processing, the shadowing processing, the screen processing, inclined letter processing, mirror processing and repeat processing. A trimming key 5031 is employed for designating an area and performing trimming. Further, a masking key 5032 works to designate an area and effect masking. A partial processing key 5033 serves to designate an area and, thereafter, designate the partial processing (the outline processing, the screen processing, the shadowing processing and negative/positive processing).

A de-frame key 5034 is used for de-framing the image. This de-framing is classified into three types, i.e., sheet de-framing (margins are formed at edges of the sheet in accordance with a sheet size), original de-framing (margins are formed at edges of the original in accordance with a size of the original) and book de-framing (margins are formed in images at the edges of the original and an image at the center thereof in accordance with a page spread size of a book).

A binding margin key 5035 is used for forming a binding margin at one edge of the sheet. A shift key 5036 works to shift a copy image. Note that this shift is classified into a parallel shift (vertical and lateral shifts), a center shift, a corner shift and a designated shift (point shift). A zoom key 5037 is capable of setting a copy magnification by 1% in a range of 25%–400%. The zoom key 5037 is also capable of independently setting the copy magnification in main-scan and sub-scan directions.

An auto zoom key 5038 automatically enlarges and reduces the image in accordance with a size of the copy paper. The auto zoom key 5038 is also capable of automatically varying the copy magnification in the main-scan and sub-scan directions. An enlarging continuous copying key 5039 is employed for enlarging and copying a single sheet of original up to a plurality of copies. Additionally, a reduction layout key 5040 is used for reducing but integrating a plurality of originals on a single sheet of output paper.

A continuous copying key 5043 serves to dividing a copying area on a board glass surface for the original into two right and left subareas and continuously automatically obtain two copies (page continuous copying, double-side continuous copying). A double-side copying key 5044 is employed for performing double-side copying (one-side/ double-side, page continuous double-side, double-side/ double-side). Also, a multikey 5045 works to obtain multi-copies (multicopying, multipage continuous copying).

A memory key 5046 is used for executing a copy mode using the image memory (memory synthesis, area synthesis, chain mark synthesis). A projector key 5047 is operated when copying a film image by use of a film projector. A printer key 5048 is operated when outputting the image data transferred from a computer, etc. A multi-original key 5050 is operated when originals in different sizes are placed on a feeder in the case of obtaining copies by use of the feeder. Then, a mode memory key 5051 is employed for registering a set copy mode in the memory and retrieving the registered copy mode.

A display screen 5052 displays a status of the copying machine, the number of copies, a copy magnification and a size of the copy paper but, when the copy mode is set, displays a content of this setting. Further, if there arises a situation making the continuance of the copying operation impossible as in the case of the paper jam caused in this digital copying machine, there are displayed graphics, motion pictures and messages for explaining how this trouble is dealt with.

Figure 11:
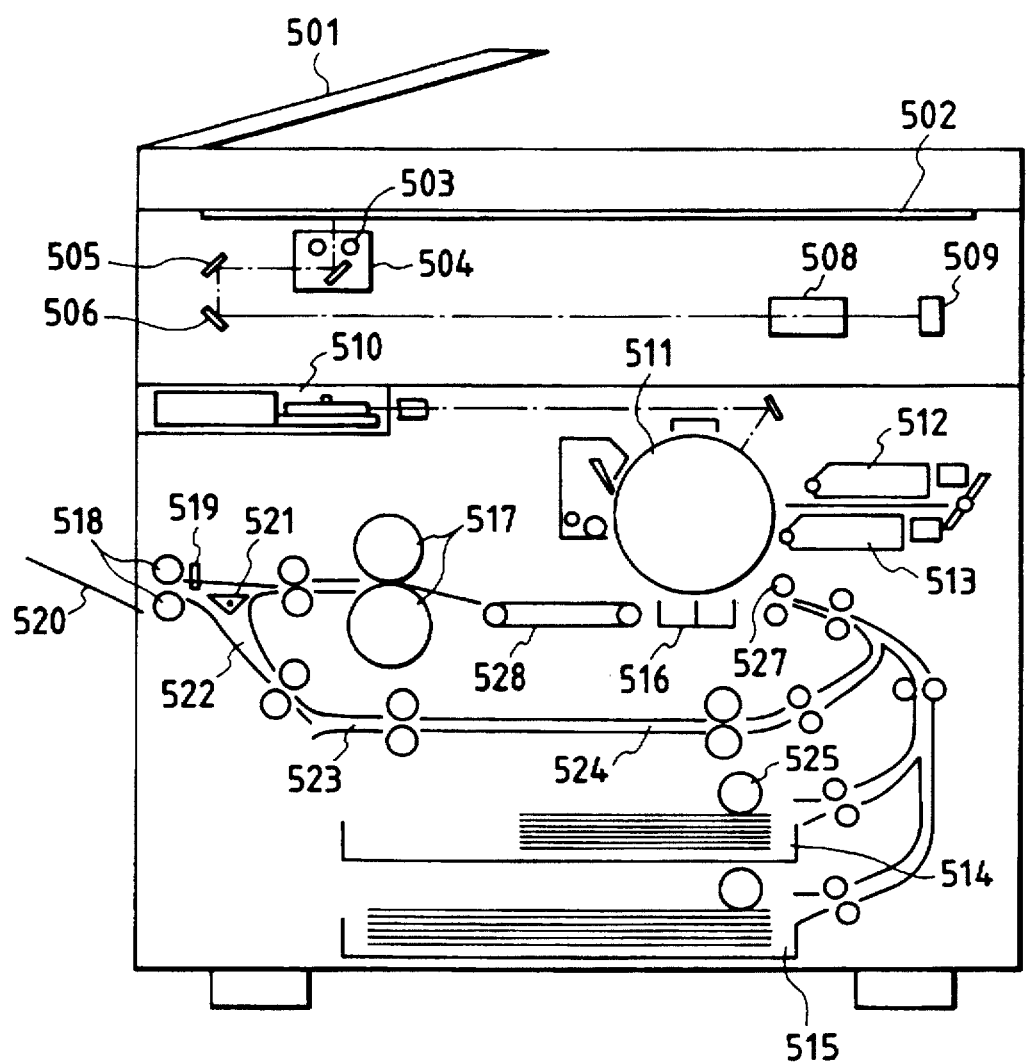
FIG. 11 is a sectional view illustrating a construction of the copying machine in the embodiment 5.

FIG. 11 is a sectional view illustrating a structure of the digital copying machine in accordance with this embodiment. Referring to FIG. 11, an original feeding device 501 feeds the originals put on the original tray sheet by sheet or continuously by twos to a predetermined position on an original board glass surface 502. Note that the original on which the copy processing has been finished is fed back to a predetermined position within the original feeding device 501.

An original scanner 503 is constructed of a original irradiation lamp and a scan mirror 504. When the original feeding device 501 feeds the original to the predetermined position on the original board glass surface 502, this original scanner 503 effects an exposure-scan on the original. A beam of light reflected from the original is guided to a lens 508 via mirrors 504–506, and an image is formed on an image sensor unit 509.

An exposure control unit 510 including a built-in laser scanner irradiates a photosensitive body 501 with the light beams modulated based on the image data outputted from an image processing unit 2500 shown in FIG. 9, thus forming an electrostatic latent image on the photosensitive body. Further, developing units 512, 513 make visible the electrostatic latent image formed on the photosensitive body 511 with a developer (toner). These two developing units are filled with developers assuming colors different from each other.

Transfer sheet stackers 514, 515 stack up the transfer sheets in a fixed size. Then, the transfer sheets are fed up to register rollers 527 by driving feed rollers 525, 526. The transfer sheets are, after taking an image front edge coincidence timing with the image formed on the photosensitive body 511, sent to an electrostatic latent image transfer unit.

A transfer separating charger 516 transfers a toner image on the photosensitive body 511 onto the transfer sheet and, thereafter, separates the transfer sheet from the photosensitive body 511. The transfer sheet is, after transferring the toner image, conveyed to the fixing device through a conveying belt 528. Subsequently, a fixing device 517 fixes the toner image while the transfer sheet formed with the toner image passes between the upper and lower heated rollers. Sheet discharge rollers 518 discharges the transfer sheet on which the image formation has been finished to a tray 520.

A direction flapper 521 is employed for diverting the feed direction of the transfer sheet one surface of which is formed with the image to an internal feed direction when performing the multi/double-side copying. Further, sheet detection sensors 519 are provided at respective locations on the sheet feeding path in the interior of the present digital copying machine, and output signals thereof are inputted to an I/O unit 4200 of the control unit 4000 of the digital copying machine.

Transfer sheet feeding paths 522, 523, 524 are used on the occasion of a multi/double-side image formation. In the case of the multiimage formation, the transfer sheet is fed in the sequence such as 521, 522 and 523, thus resupplying the sheets to the image forming unit. Also, in the case of the double-side image, formation, the transfer sheet passing through the path 521 is fed to the discharge rollers 518 and, after being diverted by the flapper 521, fed sequentially to the feeding units 522, 523, 524. The sheets are thus resupplied to the image forming unit.

Note that the respective elements on the sheet feeding path are unitized for facilitating the paper jam processing and a maintenance of the apparatus, whereby the unit single body can be drawn out in front of the apparatus. An armoring panel in the vicinity of each unit is openable and closable. For instance, the transfer sheet trays 514, 515 can be independently drawn in front of the apparatus.

Further, the elements from the fixing device 517 to the discharge rollers 518 take an integral structure and can be therefore drawn out forward (fixing unit). Moreover, the feeding paths 522, 523, 524 are drawable in the form of a tray unit outwardly of the apparatus.

Each opening/closing unit is fitted with a switch type sensor for detecting an opening/closing state, and an output signal thereof is inputted to the I/O unit 4200. Hence, the CPU 4100 is capable of monitoring the opening/closing state thereof at all times.

Given next is an explanation of the image processing unit of the copying machine in accordance with this embodiment.

The image processing unit 2500 illustrated in FIG. 9 effects a variety of processes on the image read by the operation of the original scan system 2100 or on the image data received from the computer or the like via the LAN control unit.

Figure 12:
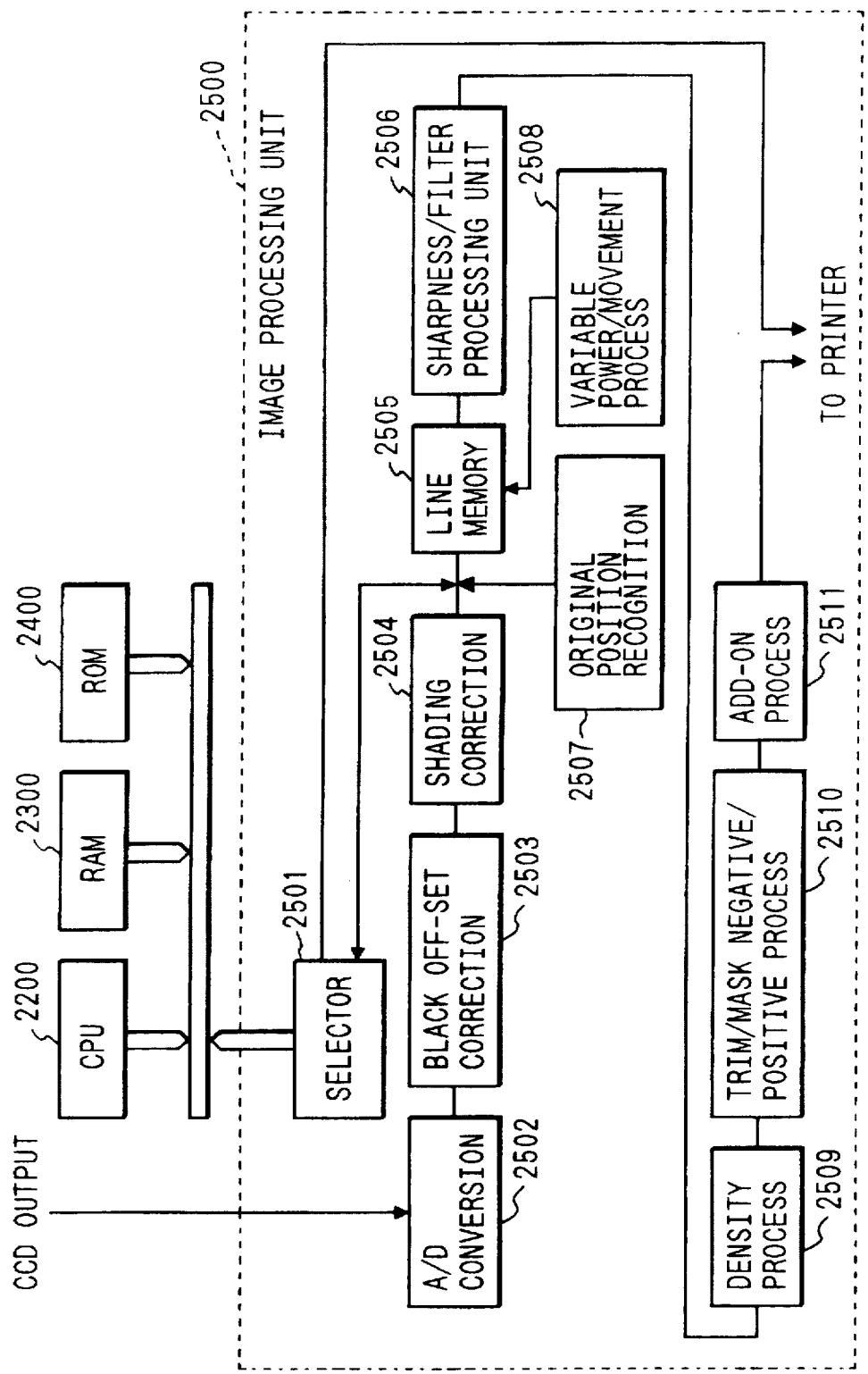
FIG. 12 is a block diagram illustrating a configuration of an image processing unit in the interior of a scanner.

FIG. 12 is a block diagram showing details of the image processing unit 2500 constituting the scanner unit 2000.

In the copying machine in accordance with this embodiment, the image of the original is scanned by the original scanning system 2100, and a result thereof is inputted to a CCD provided in the image sensor unit 509. Electric signals (analog signals) sequentially transmitted from this CCD but corresponding to densities of pixels are converted into digital signals each assuming a level corresponding to the density by an A/D converting unit 2502 shown in FIG. 12.

Thereafter, the digital signals are inputted to a black offset correcting unit 2503 for correcting an offset scatter in terms of a black density in the CCD analog amplifying unit. Next, a shading correction unit 2504 corrects a scatter in light quantity distribution or the like of an original illumination lamp, thereby correcting a level of the digital signal. Note that this signal is temporarily stored in a line memory (storage device) 2505.

An original position recognizing unit 2507 recognizes which position to place the original on the original board by use of the signal after undergoing the shading correction. Note that the variable power processing and shift processing of the image are performed by changing a timing of writing or reading the signals to or from the line memory 2505 in this embodiment.

When reading the signals from the line memory 2505, mirror image processing, foldout processing and repeat processing are conducted by changing the way of reading. Then, the signals read from the line memory 2505 are transmitted to a sharpness/filter/outline processing unit 2506.

The sharpness/filter/outline processing unit 2506 performs respective processes by calculating a density level per pixel, and a result thereof is sent to a density processing unit 2509. The density processing unit 2509 converts the level of the transmitted digital signal in accordance with an item of copy density setting data of the present digital copying machine and then outs a result of the conversion.

A negative/positive processing portion of a trim/mask-negative/positive processing unit 2510 inverts the level of the digital signal and then outputs it. Further, in the trim/mask processing, a designated area signal or an out-of-area signal is converted into one assuming a designated density level, thus performing the trim or mask processing.

An add-on processing unit 2511 reads designated character data out of the memory which stores character data beforehand and outputs this item of data in place of the image signal of the original to a designated portion. This final 8-bit digital signal is transmitted to a printer unit 6000, and the laser is switched ON/OFF, thereby reproducing bright and dark portions on the above photosensitive drum.

On the other hand, the interior of the scanner incorporates a RAM 2300 serving as an image memory for storing the original image data for a plurality of pages. The RAM 2300 is employed for storing the original image scanned by the CCD and the image data transferred from the host computer.

For example, if the present digital copying machine is operated in a remote control mode, the image data transmitted via a LAN interface unit 3000 is transferred to the RAM 2300 by a CPU 2200 and a CPU 4100 of the control unit 4000.

Note that the CPU 4100 and the CPU 2200 communicate with each other through dual port RAMs built in these CPUs. Further, a selector 2501 within the image processing unit 2500 is switched over by the CPU 2200 in accordance with a command given from the CPU 4100, and bitmap data within the RAM 2300 is transferred directly to the printer unit 6000.

If the command transferred from the CPU 4100 contains an image processing command, the image data is transferred to the line memory 2505, and designated image processing is executed.

Besides, the image data read by the CCD are sequentially processed by the image processing unit 2500 and thereafter transferred and stored in the image memory 2300. These pieces of image data are transmittable via the CPU 4100 and the LAN interface unit 3000 to the network.

In this case, the selector 2501 is changed over to a channel 2, and the analog signals from the CCD are transferred to the CPU 2200 via the A/D converter 2502, the black offset correction unit 2503, the shading correction unit 2504 and the selector 2501.

Based on the scan positional data within the original scan system 2100 defined as an optical scanning system, the CPU 2200 sequentially stores proper areas of the RAM 2300 with the data transmitted from the selector 2501. Then, after the scanning has been finished, the CPU 2200 informs the CPU 4100 of the end of the scanning.

The CPU 4100 transmits an image data take-back request command within the RAM 2300 to the CPU 2200 and thereafter sends the image data transmitted from the CPU 2200 to the network via the LAN interface 3000.

In this way, the present digital copying machines work in the form of digital printers, digital original scanners and further stand-alone digital copying machines as terminal devices of the network. Then, the switching control to each function is conducted based on selecting an operation mode inputted from an operation unit of the digital copying machine as well as on a control command transferred from the computer of the network.

The LAN interface unit 3000 illustrated in FIG. 9 is constructed of a serial interface 3100, an LAN controller 3200, a bus controller 3300 and a LAN connector 3400.

The LAN controller 3200 supervises and controls individual components within the LAN interface unit but includes an unillustrated CPU, a program ROM, an operation RAM and a FIFO memory. Then, the LAN controller 3200 is connected via the bus controller 3300 to a local bus of the control unit 4000 taking charge of IEEE802.3 medium access control (MAC).

That is, a control CPU of the control unit 4000 accesses the LAN interface unit 3000 through a specified I.O space. Transferring and receiving the data on this occasion involve the use of a bus interface.

The FIFO memory temporarily stores the data when transferred and received. Given herein is a correspondence to the communications at a higher transfer speed by increasing a capacity of the FIFO memory.

The serial interface 3100 detects a data collision represented by CSMA/CD as well as transferring and receiving the serial data. Herein, the data processed in the interior of the LAN controller 3200 are converted into data for ETHERNET (registered trademark of Zerox Corp.) by Manchester encoding, and the data on the ETHERNET are converted into a data format in the interior of the LAN controller 3200 by Manchester decoding. Then, the thus converted data are transmitted onto the network via the LAN connector 3400.

The LAN interface unit 3000 adopted in this embodiment actualizes an ETHERNET LAN connection. Further, the data communications between the CPU 4100 for controlling the copying operation and the LAN interface unit 3000 involves the use of the I/O method. However, there may be adopted other LAN connection methods, e.g., an interface technology such as a token ring method, a memory sharing method, etc.

Figure 13:
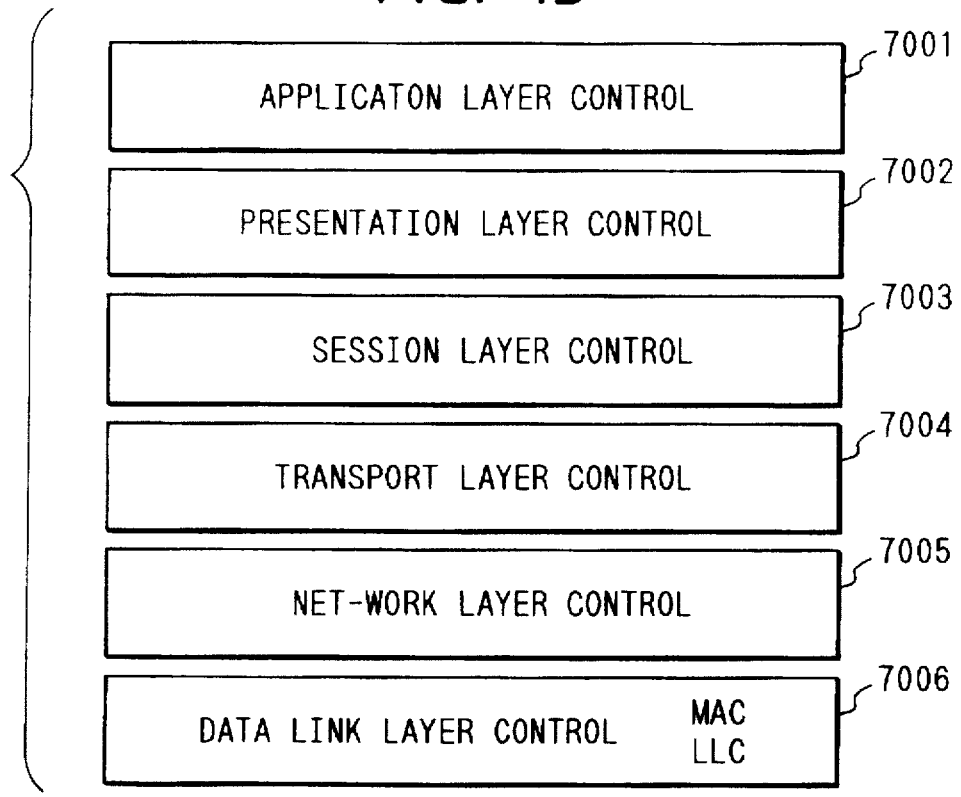
FIG. 13 is a diagram showing an architecture of a communication program executed by a control unit 4000.

FIG. 13 is a diagram illustrating an architecture of a communication control program executed by the CPU 4100 of the control unit 4000. The communication control program adopted herein has an architecture corresponding to an OSI (Open Systems Interconnection). The communication control program is constructed of program modules for an application layer control 7001, a presentation layer control 7002, a session layer control 7003, a transport layer control 7004, a network layer control 7005 and a data link layer control (including a medium access control element (MAC) and a logic link control element (LLC)) 7006.

When a data transmission request is given, the program module on each layer transfers the data to the program module positioned one hierarchy under. At this time, an item of protocol control data is added to the transmission data. On the receiving side, an extra item of protocol control data is removed from the above data in accordance with the corresponding hierarchy, and the data are transferred to the program module positioned one hierarchy above.

Connected to the network in this embodiment are a personal computer for supporting the same protocol as the above-mentioned, a large capacity storage device and a printer, and, therefore, the data communications can be performed between the present digital copying machine and the devices thereof.

Figure 14:
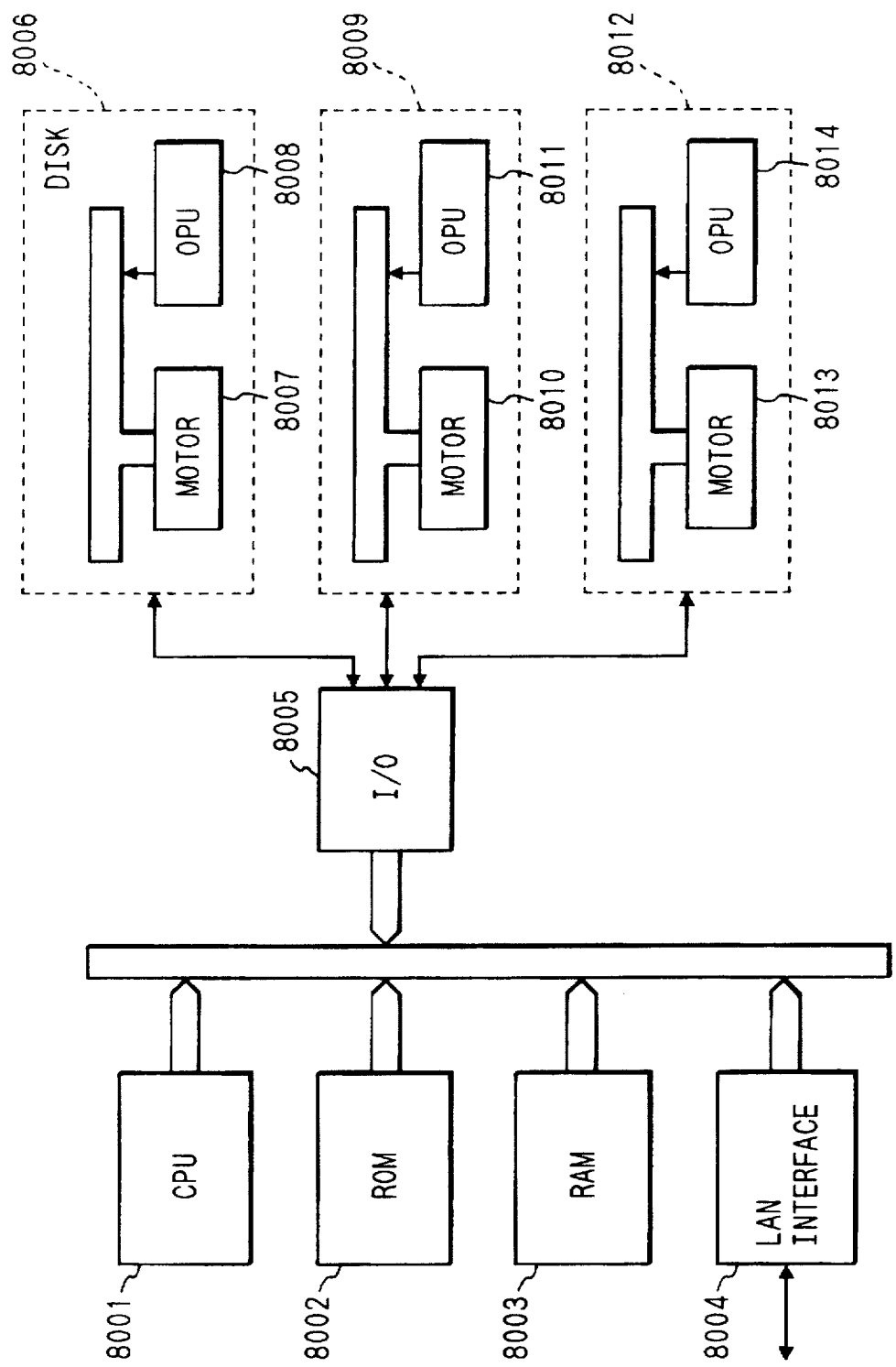
FIG. 14 is a block diagram showing a configuration of a CDROM drive 8000.

Referring next to FIG. 14, there will be explained a configuration of a CDROM drive 8000 connected via the LAN to the digital copying machine in accordance with this embodiment.

The CDROM 8000 takes such a type that the drive 8000 can loaded with a plurality of disks. A CPU designated by 8001 in FIG. 14 controls an operation of each element in the interior of the CDROM drive 8000. A ROM 8002 stores a control program executed by the CPU 8001.

An operation RAM 8003 is employed as an operation area when an OS operating on the CPU 8001 and the control program stored in the ROM 8002 come to function. Further, the RAM 8003 is also availed as a disk cache memory for the disk, and the CPU 8001 recognizes a size of the cache in accordance with a command transmitted from the computer.

A LAN interface 8004 is the same as the LAN interface unit 3000 of FIG. 9. An I/O unit 8005 is used for outputting a drive signal for each operating element within the device and inputting a digital signal transmitted from each unit.

A conventional disk 8006 composed of an aluminum layer deposited on a polycarbonate and a protection layer formed of an acrylic resin or the like. The data is recorded on a track consisting of minute consecutive pits on this disk. Further, a motor 8007 serves to rotate the disk 8006 at a high speed.

An optical unit (OPU) 8008 includes a semiconductor laser oscillation unit and a reflected light receiving unit. The OPU 8008 measures an intensity of the reflected laser beam falling on a disk 8006 and thus generates a digital signal. An intensity of the laser beam reflected from the pit portion is weak, whereas an intensity of the laser beam reflected from a land portion is strong. Hence, there are observed a variation in intensity of the reflected laser beam which corresponds to a pit arrangement pattern on the disk.

This OPU 8008 converts the reflected beam intensity under a fixed intensity into '0' but the intensity above the fixed intensity into '1' and transmits the converted values to the CPU 8001 via an I/O unit 8005. Further, the OPU 8008 has a driving device and is thereby moved in the central direction of the disk and in the direction opposite thereto in parallel to the disk surface from a disk peripheral edge.

Note that medium physical characteristics, a physical data format and regenerative conditions are pursuant to world standards proposed by Phillips/Sony Corp. in 1980. Further, MS-DOS format by Microsoft Corp. is adopted for a file format at the logical level of a file directory structure, etc.

Moreover, as for a data compression format, there is adopted MPEG (ISO-ITEC/JTC1/SC2/WG11 : Moving Picture Coding Expert Group) conceived as a standard of a storage media oriented image compression with respect to a moving picture.

The disk data storage format exemplified herein is adopted widely in the work at present, and it is of importance to conform thereto in terms of enhancing the data compatibility. The present invention can be, it is obvious, realized even by adopting data formats other than those given herein.

When the computer gives a request for reading a specified file on the disk loaded into a designated drive, the CPU 8001 calculates an on-disk physical address of the data from a file name in conformity with the respective standards and moves the OPU 8008 to a proper position. A signal outputted from OPU 8008 is decoded by the CPU 8001 and then developed within the RAM 8003 in the MS-DOS file format. Then, the CPU 8001 transmits the data to the LAN interface 8004.

Figure 15:
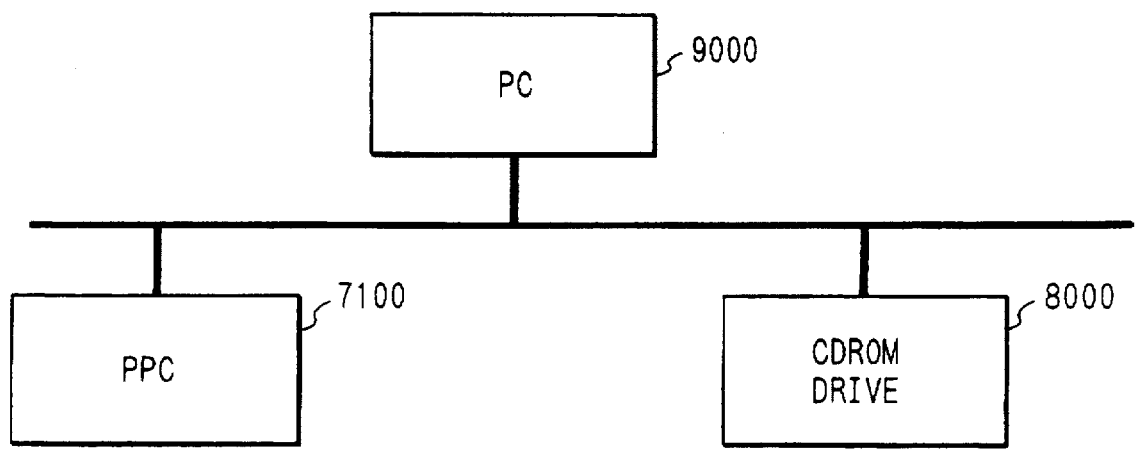
FIG. 15 is a diagram illustrating a configuration of a network environment where the copying machine in accordance with the embodiment 5 is employed.

FIG. 15 is a diagram depicting a network environment wherein the digital copying machine in this embodiment is employed. The numeral 7100 represents a coping device (PPC); 9000 denotes a personal computer (hereinafter abbreviated to PC); and 8000 designates a CDROM drive.

The PC 9000 incorporates a LAN interface circuit having the same construction and the same functions as those of the LAN interface 3000 shown in FIG. 9 and a software for performing the data communications with a variety of devices connected to the network via the this interface circuit.

Normally, the LAN interface circuit is commercially available as a function extension board of the PC. The user is capable of adding a network communication function to the PC simply connecting the function extension board to the PC. On this occasion, a method of connecting the extension board to the PC is generally a bus connecting method as shown in FIG. 9.

The software for the network communications which operates on a main CPU of the PC takes charge of the communications with the devices connected to the network. The operation thereof is substantially the same as the method by which the control CPU of the control unit 4000 transfers and receives the data to and from the LAN interface unit 3000.

More specifically, the main CPU transfers and receives the data to and from the CPU on the extension board via the specified I/O space, thus actualizing the communications with the network. The OS and other application software are normally loaded on the main CPU.

On the other hand, as a device driver corresponding to the extension board, the software taking charge of the network communications is, after initializing the CPU and loading the OS, loaded into a specified memory space and is thereafter resident in this space. Then, when there arises a necessity for the communications with the network by the application software, transferring and receiving the data with respect to the extension board are executed through the device driver.

Specifically, a function call is given from the application side. The data transferring/receiving method on this occasion, i.e., the function call format is standardized, and, hence, even if a change in the hardware of the extension board is produced, there is no necessity for changing the application software.

The following is a discussion on the operations of the copying machine 7100, the PC 9000 and the CDROM drive 8000 when the paper jam is caused in the interior of the copying machine 7100.

Figure 16B:
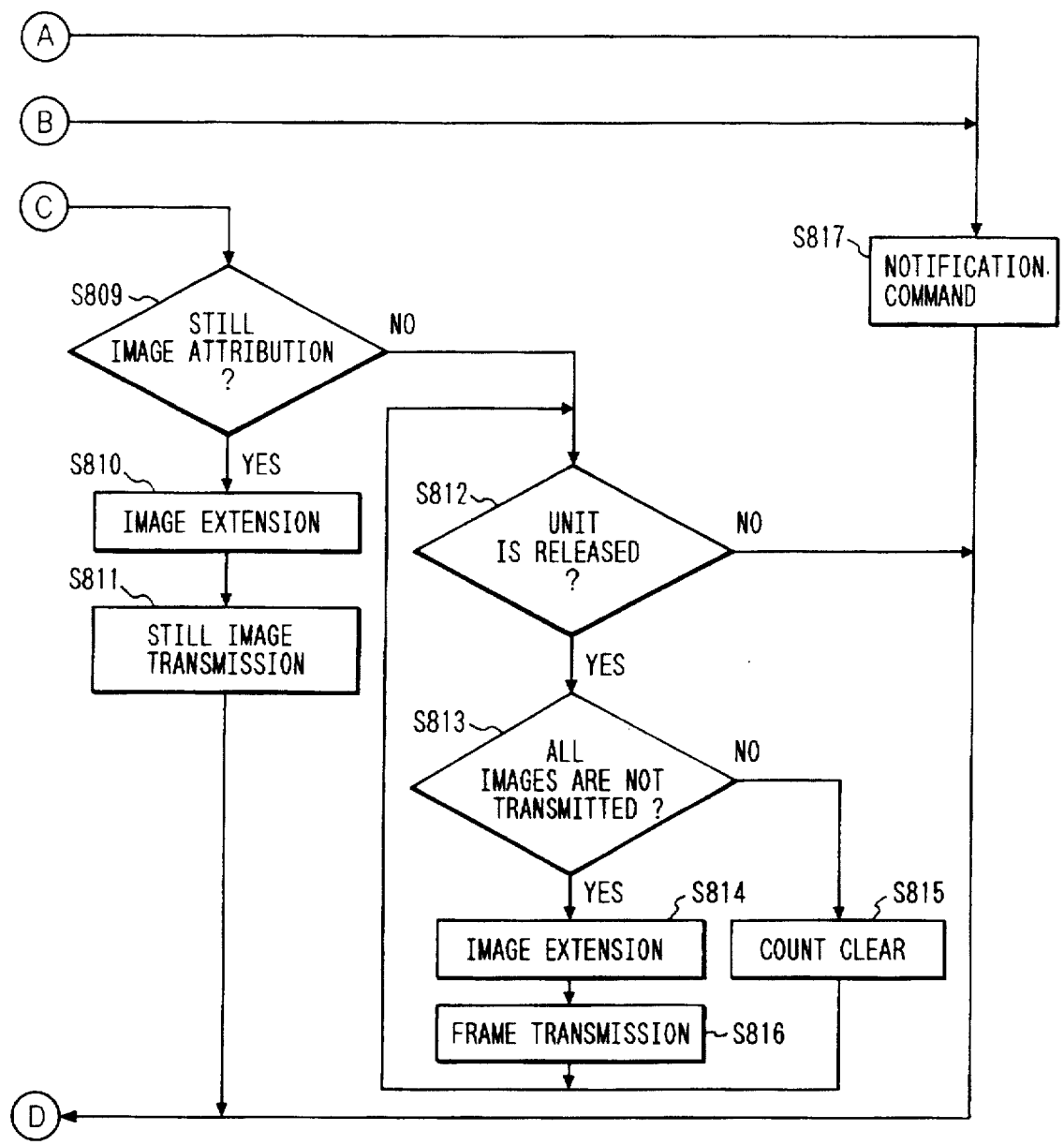
FIG. 16 which is comprised of FIGS. 16A and 16B is a flowchart showing procedures of executing the communication program executed by the control unit 4000 after detecting a paper jam.

FIGS. 16A and 16B are flowcharts showing control operating procedures by the CPU 4100 of the digital copying machine in accordance with this embodiment.

The user of the PC 9000 selects an on-network copying machine on the user interface screen and designates a printout of a designated item of image data within the PC. An internet address of the copying machine 7100 is registered in the PC 9000, and, when designating the printout, the image data is transferrable via the LAN to the copying machine 7100.

The data outputted from the PC 9000 consist of, in addition to the network control data, the number of copies, a size of the transfer sheet, an operation designating command of the copying machine and the image data to be outputted. Accordingly, the PC user is capable of starting the copying operation without touching on the operation panel of the copying machine.

The data transmitted from the PC is sent via the LAN interface 3000 of the copying machine 7100 to the CPU 4100. The CPU 4100 sets the copy mode in the RAM within the control unit 4000 in accordance with the operation designating command of the copying machine. Further, the set contents are transmitted to the operation unit 1000. The CPU 1200 causes the display unit LCD 1100 to display the set contents.

On the other hand, the image data is transferred to the image processing unit 2500 via the CPU 2200 of the scanner unit. After the image processing herein has been finished, the copying operation is started.

After starting the copying operation, the transfer sheet is sent from the transfer sheet stacker (transfer sheet tray) 514. A plurality of sheet detection sensors are disposed on the path for feeding the transfer sheet, and output signals of the sensors are inputted to the CPU 4100 via the I/O unit 4200. Then, the CPU 4100 monitors the signal transmitted from the relevant sensor at a time when the sheet is scheduled to reach each of the sensors. The CPU 4100, if the transfer sheet does not yet reach, determines that it is a delay paper jam and therefore interrupts the copying operation.

Further, if the sheet exists in a position of the relevant sensor at the scheduled sheet reaching time, whether or not the sheet exists in that sensor position is again confirmed after a given time has elapsed from that time. On this occasion, if the sheet is detected, this is determined as a residence paper jam (step S802 in FIG. 16A).

The CPU 4100, when causing any of the paper jams, transfers an image data transfer request to the CDROM drive 8000 having the internet address registered beforehand in the RAM 4300 (YES in step S803) within the control unit 4000 (step S804). This image data transfer request contains an ID of the disk loaded into the CDROM drive and a transfer request file name.

If the disk of the designated ID exists (step S805), the data transfer from the CDROM drive is started. The CPU 8001 of the CDROM drive develops the data of the designated file on the RAM 8003 from the disk having the ID. Then, the data on the RAM 8003 are transferred to the copying machine 7100 in the format shown in FIG. 17.

Note that the image data are selected corresponding to a position of the paper jam and types of a door and a unit that are to be operated by the user.

When the data is transferred to the copying machine 7100 from the CDROM drive 8000 (step S806), the CPU 4100 refers to a data attribute (step S807) and, if this data attribute indicates an item of character data, transfers a character code string to the CPU 1200 (step S808). Then, the CPU 1200 causes the display unit LCD 1100 to display the character string.

If the data attribute indicates an item of static image data (step S809), the image data is extended on the RAM 4300 within the control unit 4000 (step S810) and then transferred to the CPU 1200 (step S811).

On the other hand, if the data attribute indicates an item of dynamic image data (NO in step S809), the compressed image is extended based on a method determined by MPEG, i.e., rules of intra-frame compression coding and inter-frame prediction coding (step S814) and then developed on the RAM within the control unit 4000.

Further, the image data is transferred to the CPU 1200 (step S815) and displayed on the display unit LCD 1100. Consecutive image frames are sequentially developed on the display unit LCD. 1100, whereby the display of the dynamic image is realized. Then, the frame data corresponding to a total of the image frames to be displayed are transferred to the CPU 1200 from the CPU 4100 (answer is NO in step S813). Thereafter, a variety of setting operations are carried out to transfer the first frame data to the CPU 1200 (step S815), and the dynamic image display is circulated.

The circular display continues till the user completes the operation of drawing the unit. When the unit is returned to the original position, the display is finished. Further, if the sheets are left in another unit, the processing procedures starting from step S802 are repeated, and the display is repeated till all the paper jams in the apparatus are obviated.

After the paper jam is caused, the CPU 4100 gives a request for a file transfer to the CDROM drive 8000 (step S804). Then, if the CDROM disk of the designated ID is not loaded into the CDROM drive (NO in step S805), the CPU 4100 receives a notice command saying that there is no relevant drive from the CPU 8001 of the CDROM drive.

In this case, the CPU 4100 transfers the paper jam notice command to the CPU 1200 (step S817), and the CPU 1200 in turn develops, on the display unit LCD, a message character string corresponding to a [jam position] stored in the ROM 1400.

In this case, a capacity of the ROM 1400 mounted in the operation panel 1000 is generally small as compared with the CDROM disk, and, therefore, the message displayed in the display unit LCD 1100 is simple. For instance, a paper jam code corresponding to the jam position is displayed thereon.

As discussed above, according to this embodiment, the external storage device having the large capacity stores the image data and the character data that are to be displayed on the display unit, thereby making it possible to enrich the display contents without increasing the storage capacity of the storage device mounted in the apparatus. Especially, it is possible to display the dynamic data, which requires a large quantity of image data. It is also possible to display the easy-to-understand operation procedures and alarm messages to the user.

Further, the reading side of the image and character data displayed on the display unit can be freely set on the apparatus side, and hence the language of the display sentences can be changed without replacing the components of the apparatus.

Moreover, the large-capacity external storage device is capable of storing the message data corresponding to any kinds of languages and therefore incorporating multi-language corresponding functions.

Particularly, when a plurality of devices are connected to the network, messages to all the devices can be changed simply by giving a modification to the data on the recording medium within the external storage device.

In addition, the ROM for storing the simplified message data is incorporated into the apparatus, and, therefore, even in the case of making use of the network having a low data transfer speed, the display data are transferred from the external storage device only when required to indicate a detailed message to the user as in the case of the paper jam and an occurrence of error. It is thus feasible to prevent a decrease in the display speed when normally operated.

Further, even if the network communication function breaks down, the minimum message required is displayed, and the image forming operation can be continued.

<Modified Example>

A modified example of the embodiment 5 given above will hereinafter be described.

The copying machine in this modified example is capable of designating a reading side of the message data displayed on the display unit 1100 by an input from the operation panel or a data transfer from the PC 9000.

This designation is divided into three levels. In the case of a level 1, all pieces of message data are read from the ROM 1400 within the operation panel 1000 and displayed. In the case of a level 2, the message data are read from the external CDROM drive in a state relevant to the condition designated by the user but from the ROM 1400 in an unrelevant state. Further, in the case of a level 3, all the message data are read from the external CDROM drive.

Level setting is conducted by the input from the operation panel, and the set level is stored in the RAM 4300 within the control unit 4000 of the copying machine. When the user set the level 2, it is further necessary to set a condition for reading the message data from the external CDROM drive.

That is, if there happen a paper jam, an error enough not to continue the copying operation and a change in operation of the copying machine which is incidental to the normal copying operation, there is effected setting of displaying which message data stored in the ROM 1400 or the external CDROM.

If there happen the paper jam, the error, and the change in the state of the copying machine during the image forming operation, the CPU 4100 searches the set condition stored in the RAM 4300 and determines that the message data is read from the ROM 1400 or the CDROM.

The present invention is not limited to the above-discussed embodiments but can be modified in the range stated in the claims.

What is claimed is:

1. A display control method in a system to which an external storage device and a plurality of image processing apparatuses are connected, said method comprising the steps of:

a) causing said plurality of image processing apparatuses to respectively detect statuses of their own;

b) outputting automatically a transfer requirement of display data corresponding to a specific status to said external storage device when the specific status is detected in said step a); and c) transferring the display data from said external storage device in response to the transfer requirement to a display unit and displaying the display data on said display unit of said image processing apparatus, wherein the display data stored in said external storage device are used in common to each of said plurality of image processing apparatuses.

2. A method according to claim 1, wherein a trouble in said image processing apparatus is detected in said step a).

3. A method according to claim 2, wherein data indicating procedures of obviating the trouble is read in said step b).

4. A method according to claim 1, wherein said external storage device has a storage medium which is freely attachable and detachable.

5. A display control method in a system to which an external storage device and a plurality of image processing apparatuses are connected, each of said image processing apparatuses having a detecting means for detecting a trouble of said image processing apparatus, said method comprising the steps of:

a) Outputting a transfer requirement of display data indicating a countermeasure corresponding to a detected trouble from an image processing apparatus to said external storage device when said image processing apparatus detects the trouble; and b) transferring the display data transferred from said external storage device in response to the transfer requirement to a display unit of said image processing apparatus and displaying the display data on said display unit, wherein the display data stored in said external storage device are used in common to each of said plurality of image processing apparatuses.

6. A method according to claim 5, wherein when the display data is not transferred from said external storage device, the display data corresponding to the trouble stored in a memory of said image processing apparatus is transferred to the display unit.

7. A display control method of an image processing apparatus, comprising steps of:

a) detecting a status of said image processing apparatus;

b) discriminating a type of the status detected in said step a;

c) transferring a display data corresponding to the status stored into a memory in said image processing apparatus to a display unit when the type of the status discriminated in said step b is a first type, and outputting a transfer requirement of the display data corresponding to the status to said external storage device when the type of the status discriminated in said step b is a second type and transferring the display data transferred from said external storage device to the display unit.

8. A method according to claim 7, wherein said step a detects a trouble in said image processing apparatus.

9. A method according to claim 8, wherein said display data is data indicating a countermeasure of the detected trouble.

10. A method according to claim 7, further comprising a step of setting a type of a status to be included in the status of the second type.

11. A image processing system comprising:

a plurality of image processing apparatuses;

an external storage apparatus;

wherein each of said plurality of image processing apparatuses includes detecting means for detecting a status of said image processing apparatus; communication means for outputting a transfer requirement of display data corresponding to a status detected by said detecting means and receiving the display data transferred from said external storage apparatus; and display means for displaying the display data received, and wherein said external storage apparatus stores the display data corresponding to various kind of statuses usable in common in said plurality of image processing apparatuses.

12. A system according to claim 11, wherein said detecting means detects a trouble in said image processing apparatus.

13. A system according to claim 12, wherein said display data is data indicating a countermeasure of the detected trouble.

14. A system according to claim 11, wherein said external storage apparatus includes a freely attachable and detachable storage medium in which the display data is stored.

15. A display control apparatus of an image processing apparatus, comprising:

detecting means for detecting a status of said image processing apparatus;

discriminating means for discriminating a type of the status detected by said detecting means;

control means for transferring a display data corresponding to the status stored into a memory in said image processing apparatus to a display unit when the type of the status discriminated by said discriminating means is a first type, and outputting a transfer requirement of the display data corresponding to the status to said external storage device when the type of the status discriminated by said discriminating means is a second type and transferring the display data transferred from said external storage device to the display unit.

16. An apparatus according to claim 15, wherein said detecting means detects a trouble in said image processing apparatus.

17. An apparatus according to claim 16, wherein said display data is data indicating a countermeasure of the detected trouble.

18. An apparatus according to claim 15, further comprising setting means for setting a type of a status to be included in the status of the second type.

* * * * *

UNITED STATES PATENT AND TRADEMARK OFFICE
CERTIFICATE OF CORRECTION

PATENT NO. : 5,761,480
DATED : June 2, 1998
INVENTOR(S) : Taisei Fukada, et al.

It is certified that error appears in the above-identified patent and that said Letters Patent is hereby corrected as shown below:

Col. 2, line 22, after "data" insert --of the--.

Col. 19, line 21, change "apparatus:" to --apparatus;--.

Col. 20, line 23, change "apparatus:" to --apparatus;--.

Signed and Sealed this

Fifteenth Day of September, 1998

Attest:

BRUCE LEHMAN

*Attesting Officer*      *Commissioner of Patents and Trademarks*